(12) United States Patent
Sasaki

(10) Patent No.: US 8,717,270 B2
(45) Date of Patent: May 6, 2014

(54) LIQUID CRYSTAL DISPLAY DEVICE, DISPLAY CONTROL DEVICE, AND LIQUID CRYSTAL DISPLAY METHOD

(75) Inventor: Takashi Sasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 719 days.

(21) Appl. No.: 12/988,702

(22) PCT Filed: Apr. 20, 2009

(86) PCT No.: PCT/JP2009/057872
§ 371 (c)(1),
(2), (4) Date: Oct. 20, 2010

(87) PCT Pub. No.: WO2009/131102
PCT Pub. Date: Oct. 29, 2009

(65) Prior Publication Data
US 2011/0043439 A1    Feb. 24, 2011

(30) Foreign Application Priority Data

Apr. 21, 2008  (JP) ................................. 2008-109978

(51) Int. Cl.
*G09G 3/36*    (2006.01)
(52) U.S. Cl.
USPC ........................................................ 345/96
(58) Field of Classification Search
USPC ........................................................ 345/96
See application file for complete search history.

(56) References Cited

U.S. PATENT DOCUMENTS

| 2002/0089485 | A1 | 7/2002 | Youn |
| 2009/0079713 | A1 | 3/2009 | Nagashima |
| 2009/0115772 | A1* | 5/2009 | Shiomi et al. ................. 345/214 |

FOREIGN PATENT DOCUMENTS

| JP | 9-15560 A | 1/1997 |
| JP | 9-243998 A | 9/1997 |
| JP | 2002-196731 A | 7/2002 |
| JP | 2007-192867 A | 8/2007 |
| JP | 2007-226260 A | 9/2007 |
| WO | WO 2007/015347 A1 | 2/2007 |

* cited by examiner

*Primary Examiner* — Dennis Joseph
(74) *Attorney, Agent, or Firm* — Birch, Stewart, Kolasch & Birch, LLP

(57) ABSTRACT

The liquid crystal display device inverts the polarity of the data signal once in the first one of n iterations (n is an integer of 2 or more) of the horizontal blanking period. Then, in each of the remaining n−1 iterations of the horizontal blanking period, the polarity of the data signal is inverted twice. A plurality of data lines are short-circuited together when inverting the polarity of the data signal, and a scan line is selected in a write period during which the data signal is applied to a picture element forming portion. Moreover, a scan line is selected in synchronism with a timing for short-circuiting the data lines before the once-selected scan line is selected again in a write period.

8 Claims, 8 Drawing Sheets

F I G. 1
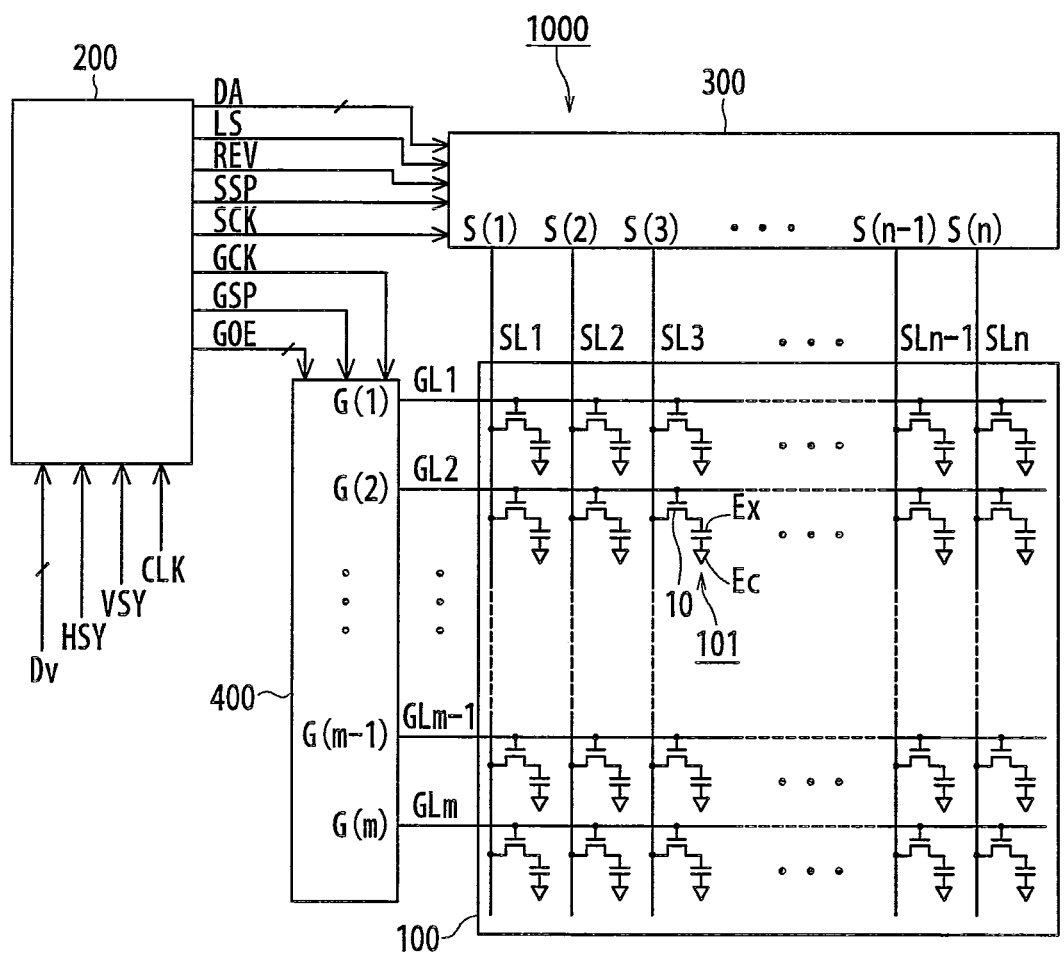

LIQUID CRYSTAL DISPLAY DEVICE, DISPLAY CONTROL DEVICE, AND LIQUID CRYSTAL DISPLAY METHOD

TECHNICAL FIELD

The present invention relates to a liquid crystal display device, a display control device and a liquid crystal display method, in which the polarity of a data signal is maintained over two or more successive iterations of the write period.

Note that this application claims priority to Japanese Patent Application No. 2008-109978 filed on Apr. 21, 2008, the disclosure of which is hereby incorporated by reference in its entirety.

BACKGROUND ART

A technique is known in the known art in which when inverting the polarity of a data signal in a liquid crystal display device, a plurality of data lines are short-circuited in synchronism with the polarity inversion timing to thereby save the power consumption (e.g., Patent Document 1). Also known is a technique directed to a configuration where the data signal is output from a data driver, wherein the polarity of the data signal is controlled by inputting a polarity-specifying signal to the data driver (e.g., Patent Document 2).

Also known in the art is charge-shared impulse in which a voltage corresponding to black display is realized by utilizing an operation of short-circuiting a plurality of data lines (e.g., Patent Document 3). Specifically, a scan signal line is selected at least in one effective scanning period in each frame period, and at least one black signal insertion period is provided after the scan signal line is selected in the effective scanning period and before the scan signal line is selected in an effective scanning period in the next frame period. Then, in the black signal insertion period, the scan signal line is selected and data signal lines are short-circuited. As a result, the charges of the data signal lines selected in the black signal insertion period are averaged out, and the display is brought closer to black. Therefore, the display of picture elements can be made substantially black within one frame period by repeated selection in the black signal insertion periods.

On the other hand, another driving technique is also known in the art in which during a write period of a data signal to a picture element forming portion connected to a plurality of adjacent scan lines, the polarity of the data signal is maintained, and the polarity is inverted for each frame (Patent Document 4). The driving technique (hereinafter referred to also as a "multiple line inversion driving operation") has a lower polarity transition frequency as compared with a driving operation in which the polarity of the data signal is transitioned for each scan line and the polarity is inverted for each frame. Therefore, it is possible to save the power consumption.

Citation List

Patent Document

Patent Document 1: Japanese Published Patent Application No. 9-243998

Patent Document 2: Japanese Published Patent Application No. 2002-196731

Patent Document 3: International Publication WO2007/015347 pamphlet

Patent Document 4: Japanese Published Patent Application No. 9-15560

SUMMARY OF THE INVENTION

Technical Problem

However, in a configuration where the data signal polarity transition and the data line short-circuiting are done at the same time, it is not possible to perform the above-described short-circuiting equally across all scan lines while maintaining the polarity thereof when performing the multiple line inversion driving operation. Therefore, it is not possible to apply a voltage corresponding to black display equally across all scan lines. Thus, it is not possible to use the impulse driving operation while at the same time saving the power consumption as described above.

The reason why it is not possible to perform the above-described short-circuiting equally across all scan lines while maintaining the polarity thereof when performing the multiple line inversion driving operation will now be described with reference to the drawings. FIG. 1 is a block diagram of a liquid crystal display device 1000. A display section 100 of the liquid crystal display device 1000 is driven by a display control circuit 200, a data driver 300 and a gate driver 400, as shown in FIG. 1. The display section 100 includes a plurality of (e.g., m) scan lines GL1 to GLm, and a plurality of (e.g., n) data lines SL1 to SLn crossing each of the scan lines GL1 to GLm. Moreover, a plurality of (m×n) picture element forming portions 101 are provided at the intersections between the scan lines GL1 to GLm and the data lines SL1 to SLn.

These picture element forming portions 101 are arranged in a matrix pattern in the display section 100. A TFT 10 is formed in each picture element forming portion 101. Here, TFT means a thin film transistor. The TFT 10 is a switching element whose gate terminal is connected to a scan line, and whose source terminal is connected to a data line. The display section 100 is provided with a common electrode Ec which is common to all the picture element forming portions 101. The display section 100 is provided with a picture element electrode Ex for each picture element forming portion 101. The picture element electrode Ex is connected to the drain electrode of the TFT 10. The common electrode Ec and the picture element electrode Ex provided for each picture element forming portion 101 oppose each other with a small gap therebetween. A liquid crystal layer (not shown) is provided between the common electrode Ec and the picture element electrodes Ex provided as described above.

The data driver 300 and the gate driver 400 give the picture element electrode Ex of each picture element forming portion 101 a potential according to the image to be displayed. Note that the operations of the data driver 300 and the gate driver 400 will be described later. On the other hand, a predetermined potential Vcom is given to the common electrode Ec from a power source circuit (not shown). Thus, a voltage according to the potential difference between the picture element electrode Ex and the common electrode Ec is applied across the liquid crystal. The intensity of light passing through the liquid crystal layer is controlled by the applied voltage, thus displaying an image. That is, a data signal output from the data driver 300 is applied to the data lines SL1 to SLn while a scan line is selected by a selection signal output from the gate driver 400. Thus, a voltage is written to the selected picture element forming portion 101.

Note that in the present embodiment, color filters of three colors (e.g., RGB) are formed corresponding to the picture elements. The configuration is such that light which has passed through the liquid crystal layer passes further through color filters of different colors. That is, a large number of colors can be expressed by controlling the intensity of light passing through three colors of color filters based on the applied voltage described above. A combination of picture elements corresponding to three colors described above together form one pixel. The display section 100, the data driver 300 and the gate driver 400 of the present embodiment together form a liquid crystal module. The liquid crystal module, the display control circuit (the display control device) 200, an I/F to be described later, a circuit (not shown), etc., together form a liquid crystal display device.

FIG. 6 shows an example of the data driver 300 for performing the data signal polarity transition and the data line short-circuiting at the same time. The data driver 300 shown in FIG. 6 includes a charge sharing section 310 for charge sharing, and a timing control section 320 for controlling the timing of charge sharing. The charge sharing section 310 includes n output buffers 31 (buffers). These output buffers 31 receive analog voltage signals d(1) to d(n) generated based on a digital image signal DA for specifying the voltage level of the data signal. The output buffer 31 functions as a voltage follower for generating the data signals S(1) to S(n) through impedance-conversion of the analog voltage signals d(1) to d(n).

The data driver 300 generates the data signals S(1) to S(n) based on the digital image signal DA and the start pulse signal SSP and the clock signal SCK for the data driver.

As shown in FIG. 6, first MOS transistors SWa as switching elements are connected to the output terminals of the buffers 31. The data signal S(i) generated in each buffer 31 is output from the output terminal of the data driver 300 via the first MOS transistor SWa. Adjacent output terminals of the data driver 300 are connected together by second MOS transistors SWb as switching elements. Thus, a plurality of data lines SL1 to SLn are connected together by the second MOS transistors SWb.

The gate terminals of the second MOS transistors SWb are connected to an AND circuit 37. The gate terminals of the first MOS transistors SWa are connected to the AND circuit 37 with an inverter 33 interposed therebetween. The inverter 33 outputs an inverted signal of the charge sharing control signal Csh. The output terminals of the buffers 31 are connected to the source terminals of the first MOS transistors SWa.

Thus, the charge sharing control signal Csh from the AND circuit 37 is given to the gate terminal of the second MOS transistor SWb. The output signal of the inverter 33, i.e., the inverted signal of the charge sharing control signal Csh, is given to the gate terminal of the first MOS transistor SWa.

Therefore, when the charge sharing control signal Csh is inactive (low level), the first MOS transistor SWa is turned ON (conductive state) and the second MOS transistor SWb is turned OFF (blocking state). Thus, the data signals S(1) to S(n) generated in the buffers 31 are output from the data driver 300 via the first MOS transistors SWa. Note that the data lines SL1 to SLn of the data signals S(1) to S(n) are connected to picture element electrodes of picture elements in the liquid crystal display device 1000 (see FIG. 1).

In contrast, when the charge sharing control signal Csh is active (high level), the first MOS transistor SWa is turned OFF (blocking state) and the second MOS transistor SWb is turned ON (conductive state) as shown in FIG. 6. Thus, the data signals S(1) to S(n) generated by the buffers 31 are not output as they are blocked by the first MOS transistors SWa. That is, the data signals S(1) to S(n) are not applied to the data lines SL1 to SLn (see FIG. 1). As shown in FIG. 6, the second MOS transistors SWb are brought to a conductive state. Thus, a plurality of data lines SL1 to SLn are short-circuited together via the second MOS transistors SWb. As a result, the picture element electrodes Ex (see FIG. 1) are short-circuited via a plurality of data lines SL1 to SLn, thereby averaging out the voltages of the picture element electrodes Ex.

On the other hand, the timing control section 320 includes D flip flops 34 and 35, an EXOR circuit 36, and the AND circuit 37, as shown in FIG. 6. The timing control section 320 is configured so as to generate the charge sharing control signal Csh. The charge sharing control signal Csh is generated based on a polarity specifying signal REV and a reference specifying signal LS. The polarity specifying signal REV is a signal specifying the polarity of the data signal. The reference specifying signal LS is a signal specifying the timing for referencing the polarity specified by the polarity specifying signal.

The signal line of the reference specifying signal LS is connected to a clock input terminal CLK1 of the D flip flop 34, a clock input terminal CLK2 of the D flip flop 35, and a first input terminal D41 of the AND circuit 37, as shown in FIG. 6. Thus, the reference specifying signal LS is input to the D flip flop 34, the D flip flop 35, and the AND circuit 37.

The signal line of the polarity specifying signal REV is connected to an input terminal D1 of the D flip flop 34. Thus, the polarity specifying signal REV is input to the D flip flop 34.

An output terminal Q1 of the D flip flop 34 is connected to an input terminal D2 of the D flip flop 35 and a first input terminal D31 of the EXOR circuit 36. Thus, a signal REV1D output from the D flip flop 34 is input to the D flip flop 35 and the EXOR circuit 36.

Moreover, an output terminal Q2 of the D flip flop 35 is connected to the other input terminal D32 of the EXOR circuit 36. Thus, a signal REV2D output from the D flip flop 35 is input to the EXOR circuit 36.

An output terminal Q3 of the EXOR circuit 36 is connected to a second input terminal D42 of the AND circuit 37. Thus, an output signal EXOR of the EXOR circuit 36 is input to the AND circuit 37. The signal Csh output from the AND circuit 37 is the charge sharing control signal described above.

FIGS. 7 and 8 are exemplary timing diagrams of signals input/output to/from the data driver shown in FIG. 6. Now, referring to FIGS. 6-8, how the D flip flop 34, the D flip flop 35, the EXOR circuit 36 and the AND circuit 37 are driven will be described.

The D flip flop 34 references the polarity specifying signal REV at rising timings (e.g., ta and tb in FIGS. 7 and 8) of the reference specifying signal LS input to the clock input terminal CLK1 (see FIG. 6). Then, the D flip flop 34 outputs the output signal REV1D having the same voltage level as the voltage level of the polarity specifying signal REV at the timings ta and tb as shown in FIGS. 7 and 8.

The D flip flop 35 references the output signal REV1D at the rising timings (e.g., ta and tb in FIGS. 7 and 8) of the reference specifying signal LS based on the reference specifying signal LS input to the clock input terminal CLK2 (see FIG. 6). Then, the D flip flop 35 outputs the output signal REV2D having the same voltage level as that of the output signal REV1D at the timings to and tb as shown in FIGS. 7 and 8.

The EXOR circuit 36 receives the output signal REV1D of the D flip flop 34 and the output signal REV2D of the D flip flop 35 as shown in FIG. 6. The EXOR circuit 36 outputs a signal at low level (L) when these signals REV1D and REV2D coincide with each other, and a signal at high level (H) when they do not coincide with each other, as shown in FIGS. 7 and 8. Here, the signal EXOR output from the EXOR circuit 36 is input to the AND circuit 37.

The AND circuit 37 is a logical product circuit, and obtains the AND (logical product) between the signal input to the first input terminal D41 and the signal input to the second input terminal D42. Here, the AND circuit 37 performs a logical product operation between the reference specifying signal LS and the output signal EXOR of the EXOR circuit 36. That is, it outputs a signal at high level (H) when the reference specifying signal LS and the output signal EXOR are both at high level (H), and outputs a signal at low level (L) otherwise.

Therefore, when the output signal EXOR is at low level (L), the pulse signal of the reference specifying signal LS is blocked. When the output signal EXOR of the EXOR circuit 36 is at high level (H), the pulse signal of the reference specifying signal LS is allowed to pass.

As described above, the timing control section 320 generates the output signal EXOR based on the polarity specifying signal REV and the reference specifying signal LS (see FIGS. 6-8). Then, the reference specifying signal LS is selected appropriately based on the generated output signal EXOR. That is, a pulse P1 of the reference specifying signal LS is allowed to pass only when the output signal EXOR generated based on the polarity specifying signal REV and the reference specifying signal LS is at high level (H). The pulse P1 of the reference specifying signal LS output at a particular timing (when the output signal EXOR is at high level (H)) from the timing control section 320 constitutes the charge sharing control signal Csh described above.

FIG. 7 is a timing diagram of various signals where the data signal S(i) is controlled by using the data driver 300 described above so that the polarity thereof does not transition in horizontal blanking periods over two successive iterations of the write period. Note that in FIG. 7, a horizontal blanking period is denoted as BL, and a write period as WR. As shown in FIG. 7, one horizontal scanning period (1H) is formed by one horizontal blanking period BL and one write period WR. In the example shown in FIG. 7, the polarity of the polarity specifying signal REV is inverted once every two horizontal scanning periods (2H). The reference specifying signal LS is formed by the pulse P1 which is inverted twice in a horizontal blanking period BL, and the pulse P1 appears with a cycle synchronized with one horizontal scanning period (1H) as shown in FIG. 7.

The polarity specifying signal REV and the reference specifying signal LS are input to the data driver 300 as shown in FIG. 6. As shown in FIGS. 6 and 7, the D flip flop 34 of the timing control section 320 references the polarity specifying signal REV at the timing ta synchronized with the rise of the reference specifying signal LS (the pulse P1). Therefore, the output signal REV1D of the D flip flop 34 is a signal obtained by delaying the polarity specifying signal REV to the rising timing ta of the reference specifying signal LS.

In contrast, the D flip flop 35 references the output signal REV1D at the timing ta synchronized with the rise of the reference specifying signal LS. In the reference specifying signal LS, the pulse P1 appears with a cycle synchronized with one horizontal scanning period (1H) as described above. Therefore, the output signal REV2D of the D flip flop 35 is a signal obtained by delaying the output signal REV1D by one horizontal period.

Note that as shown in FIG. 7, if the polarity of the polarity specifying signal REV1D changes at the same timing ta, the D flip flop 35 references the polarity specifying signal REV1D before the polarity changes. Therefore, the output signal REV2D of the D flip flop 35 is a signal of which the timing Ea when the polarity of the output signal REV1D changes is delayed by one horizontal scanning period (1H) from the output signal REV1D of the D flip flop 34. Note that the timing at which the polarity of the output signal REV2D of the D flip flop 35 changes is denoted as Eb in FIG. 7.

As a result, as shown in FIG. 7, the polarity of the output signal REV1D and that of the output signal REV2D are each inverted with a cycle synchronized with two horizontal scanning periods (2H). The timings Ea and Eb when the polarity of the output signal REV1D and that of the output signal REV2D change, respectively, are shifted from each other by one horizontal scanning period (1H). Therefore, the timing at which their voltage levels coincide with each other appears once every two horizontal scanning periods (2H).

The output signal EXOR of the EXOR circuit 36 (see FIG. 6) is at low level (L) when the output signal REV1D and the output signal REV2D coincide with each other, and at high level (H) when the output signal REV1D and the output signal REV2D do not coincide with each other. Therefore, the output signal EXOR is a signal whose polarity is inverted every horizontal scanning period (1H). The charge sharing control signal Csh, which is the output signal of the AND circuit 37, is the AND (logical product) between the output signal EXOR of the EXOR circuit 36 and the reference specifying signal LS. Therefore, it is a signal obtained by allowing the pulse P1 of the reference specifying signal LS to pass when the output signal EXOR of the EXOR circuit 36 is at high level (H). Thus, the charge sharing control signal Csh is a signal obtained by allowing the pulse P1 of the reference specifying signal LS to pass at a rate of once every two horizontal scanning periods (2H).

On the other hand, the data driver 300 (see FIG. 6) generates an analog signal (herein, the analog voltage signal d(i)) based on the digital image signal DA by using a circuit (not shown). Note that the voltage level (polarity) of the analog voltage signal d(i) is herein controlled so as to change in synchronism with the output signal REV1D.

Due to the functions of the inverter 33 and the first MOS transistors SWa described above, each analog voltage signal d(i) is output as a data signal S(i) when the charge sharing control signal Csh is at low level (L).

When the charge sharing control signal Csh is at high level (H), the data signals S(1) to S(n) are blocked from the data lines SL1 to SLn due to the functions of the inverter 33 and the first MOS transistors SWa. Moreover, when the charge sharing control signal Csh is at high level (H), a plurality of data lines are short-circuited together due to the functions of the second MOS transistors SWb. That is, the short-circuiting of picture element electrodes (charge sharing) occurs when the charge sharing control signal Csh is at high level (H).

The analog voltage signal d(i) and the data signal (S(i)) described above are in synchronism with the output signal REV1D. Therefore, the polarity of the analog voltage signal d(i) changes at a timing (ta1) at which the polarity of the output signal REV1D changes. The charge sharing control signal Csh described above is in synchronism with the output signal REV1D as shown in FIG. 7.

Therefore, the charge sharing (the short-circuiting of picture element electrodes) described above is synchronized with the timing (ta1) at which the polarity of the output signal REV1D changes. The timing (ta1) at which the polarity of the output signal REV1D changes occurs at a rate of once every two occurrences of the horizontal blanking period BL. Therefore, charge sharing (short-circuiting of picture element electrodes) is also performed at a rate of once every two occurrences of the horizontal blanking period BL.

During the charge sharing, picture element electrodes on the same scan line are connected together by a plurality of data lines and the second MOS transistors SWb. Therefore, the voltages applied to the picture element electrodes on the same scan line connected to the plurality of data lines are averaged out. Thus, voltages applied to picture element electrodes on the scan line come closer to a voltage corresponding to black display (hereinafter also referred to simply as the "black voltage"). Therefore, with such charge sharing, it is possible to reduce the power consumption when the polarity of the data signal S(i) is inverted. Note that a configuration where a signal of the opposite polarity is applied after voltages of data lines are brought to be equal to the black voltage by short-circuiting adjacent data lines together when the polarity of the data signal S(i) is inverted as described above has been proposed in the prior art (e.g., Patent Document 1) as means for reducing the power consumption. Thus, it is not limited to the configuration shown in FIG. 6.

In addition to reducing the power consumption as described above, the charge sharing described above can also be used in an impulse driving operation for bringing voltages applied to picture element electrodes closer to the black voltage. That is, in an impulse driving operation, a black image is inserted within a period over which one frame is displayed. When used in an impulse driving operation, the data line voltage during charge sharing may be set to the black voltage. In this case, charge sharing among picture element electrodes (short-circuiting of picture element electrodes) is performed within the horizontal blanking period BL, before the elapse of one frame period after the data signals S(i) are applied to the picture element electrodes. By charge sharing (short-circuiting of picture element electrodes), the voltages applied to the plurality of picture element electrodes are averaged out. Thus, the voltages applied to picture element electrodes can be set equal to the black voltage by performing charge sharing with the data line voltage set to the black voltage before the elapse of one frame period after the data signals S(i) are once written to the picture element electrodes. Thus, it is possible to perform an impulse driving operation of releasing the write voltages applied to picture element electrodes before the elapse of one frame period. Therefore, it is possible to improve the image quality by, for example, preventing afterimages of a liquid crystal display device.

The impulse driving operation is realized by adjusting the selection signal output timing in the gate driver 400 shown in FIG. 1. However, the data driver 300 shown in FIG. 6 has a specification such that charge sharing is performed only at the timing at which the polarity of the data signal S(i) is inverted because of the timing control section 320. The impulse driving operation no longer functions appropriately because such a specification is employed.

Specifically, the gate driver 400 successively selects the scan lines GL1 to GLm each in one write period during each frame period (each vertical scanning period) of the digital image signal DA. In this operation, the signal G(j) (see FIG. 7) output from the gate driver 400 to the scan lines GL1 to GLm is based on the gate start pulse signal GSP, the gate clock signal GCK, and the gate driver output control signal GOEr (r=1, 2, . . . , q). Thus, at the timing at which the scan lines GL1 to GLm are selected, the data signals S(1) to S(n) are applied to the picture element electrodes of the picture element forming portions 101. For the impulse driving operation, the gate driver 400 selects a scan line a plurality of times each in a horizontal blanking period BL after the elapse of a predetermined period of time since the selection of the scan line in the write period WR. That is, the gate driver 400 selects a scan line, which has once been selected, a plurality of times in horizontal blanking periods BL before the scan line is selected again in a write period WR.

That is, the gate driver 400 is configured to output selection signals G(j) (see FIG. 7) to scan lines GLj (j=1, 2, . . . , m). As shown in FIGS. 1 and 7, the gate driver 400 applies, to a scan line GLj, a selection pulse Pw for writing the data signal and selection pulses Pb for the impulse driving operation. The picture element forming portions 101 of a scan line GLj to which the selection pulse Pw is applied are selected (see FIG. 1). That is, TFTs 10 connected to the selected scan line GLj are ON, and TFTs 10 connected to non-selected scan lines are OFF. Since the selection pulse Pw is at high level (H) during a write period WR in one horizontal scanning period (1H), data signals S(i) are applied to the picture element forming portions 101 along the scan line GLj selected by the selection pulse Pw during that write period WR.

On the other hand, the impulse driving operation should be successively performed a plurality of times at timings synchronized with the reference specifying signal LS in horizontal blanking periods BL after the elapse of a predetermined period of time (e.g., ⅔V) since the rise of the selection pulse Pw within one frame period (1V), as disclosed in Patent Document 3. That is, the scan lines GL1 to GLm are successively selected by switching the selection line from one line to an adjacent line with a cycle of one horizontal scanning period (1H). Therefore, for each of the scan lines GL1 to GLm, the selection pulse Pb should first be generated after the elapse of a certain period of time since the rise of the selection pulse Pw, and the selection pulse Pb should be successively generated a plurality of times at timings synchronized with the reference specifying signal LS. For example, if the selection pulse Pb is successively generated three times at timings synchronized with the reference signal, the voltage of the picture element electrode then becomes equal to the black voltage, as shown in FIG. 3 of Patent Document 3.

However, in a configuration where the data driver 300 is used, and the polarity of the data signal S(i) is inverted at a rate of once every two iterations of the write period WR (see FIG. 7), the selection pulse Pb and the polarity inversion of the data signal S(i) synchronize with each other only at a rate of once every two iterations of the write period WR. Therefore, even if the selection pulse Pb is successively generated a plurality of times at timings synchronized with the reference specifying signal LS, charge sharing can be performed only for some of the selection pulses Pb. For example, in the example shown in FIG. 7, the second selection pulse Pb (2) synchronizes with the timing (ts1) at which the polarity of the data signal S(i) is inverted, among three selection pulses Pb (1), Pb(2) and Pb(3) applied to the scan line GLj. However, the other selection pulses Pb (1) and Pb(3) do not synchronize with the timing (ts1) at which the polarity of the data signal S(i) is inverted. Therefore, charge sharing is performed only at the timing at which this second selection pulse Pb (2) is generated. In this case, in the example shown in FIG. 7, charge sharing (short-circuiting of picture element electrodes) occurs only once for the scan line GLj. Therefore, the voltage applied to the picture element electrode (L(i,j) shown in FIG. 7) merely lowers and does not reach the black voltage.

Although not shown in the figures, if a configuration is employed in which the selection pulse Pb is generated every two horizontal scanning periods (2H), the timing of the selection pulse Pb coincides with the timing at which the polarity of the data signal S(i) is inverted. Therefore, charge sharing can be performed in synchronism with every selection pulse Pb. However, the timing of polarity inversion of the data signal S(i) appears only at a rate of once every two horizontal scanning periods (2H). Therefore, the predetermined period of time (⅔V in the example shown in FIG. 7) from the rise of the selection pulse Pw to the first selection pulse Pb cannot be kept constant between adjacent scan lines.

For example, when the predetermined period of time is ⅔V for a scan line, the predetermined period of time is ⅔V−1H or ⅔V+1H for an adjacent scan line. Thus, the predetermined period of time cannot be kept constant for all scan lines. Moreover, the timing at which the impulse driving operation is started changes every 2 scan lines. Therefore, the impulse driving operation cannot be performed uniformly across the display section 100 of the liquid crystal display device, thus lowering the image quality improving effect.

In any case, the timing control section 320 included in the data driver 300 shown in FIG. 6 short-circuits adjacent data lines when the polarity of the data signal S(i) is inverted as described above, and it is therefore possible to save the power consumption. However, with the timing control section 320, the impulse driving operation cannot function appropriately.

Note that the above-described example shown in FIG. 7 is a driving method in which the polarity of the data signal S(i) is inverted at a rate of once every two iterations of the write period WR. The configuration is not limited to this as long as the cycle of polarity inversion of the data signal S(i) is two horizontal scanning periods (2H) (i.e., multiple line inversion driving operation) or more. For example, also with a configuration where the polarity of the data signal S(i) in the write period WR is inverted at a rate of once every three horizontal scanning periods (3H) as shown in FIG. 8, there will be similar problems to those described above with the data driver 300 using the timing control section 320 described above (see FIG. 6).

FIG. 8 is a timing diagram for a case where the polarity specifying signal REV whose polarity is inverted at a rate of once every three horizontal scanning periods (3H), and the reference specifying signal LS which generates a pulse during the horizontal blanking period BL at a rate of once every horizontal scanning period (1H) are input to the timing control section 320.

In this case, as shown in FIGS. 6 and 8, as the polarity specifying signal REV is input to the D flip flop 34 (see FIG. 6), the output signal REV1D is generated whose polarity changes at a rate of once every three horizontal scanning periods (3H) (see FIG. 8). Moreover, the output signal REV2D obtained by delaying the output signal REV1D is generated (see FIG. 8) by the D flip flop 35 (see FIG. 6).

In the example shown in FIG. 8, in the first horizontal scanning period (1H) of the three horizontal scanning periods (3H), the polarity of the output signal REV1D changes, and the voltage level of the output signal REV1D is no longer equal to that of the output signal REV2D. Therefore, the output EXOR of the EXOR circuit 36 (see FIG. 6) changes to high level (H) in this first horizontal scanning period (see FIG. 8). The AND circuit 37 (see FIG. 6) which is a logical product circuit allows the pulse P1 of the reference specifying signal LS to pass when the output EXOR of the EXOR circuit 36 (see FIG. 6) is at high level (H) (see FIG. 8). That is, the charge sharing control signal Csh output from the AND circuit 37 (see FIG. 6) is a signal obtained by allowing the pulse P1 of the reference specifying signal LS to pass when the output EXOR is at high level (H).

In the data driver 300, the voltage level of the data signal S(i) is controlled so as to have a polarity that is indicated by the output signal REV1D. Thus, the polarity of the data signal S(i) is inverted at a rate of once every three horizontal scanning periods (3H) as shown in FIG. 8. Then, charge sharing (short-circuiting of picture element electrodes) is performed at the timing (ts2) at which the polarity of the data signal S(i) is inverted. With such a driving operation, the polarity of the data signal S(i) is maintained over three horizontal scanning periods (3H), and it is therefore possible to realize a power-saving driving operation.

However, as shown in FIG. 8, the black voltage is not applied to picture element electrodes appropriately by the selection pulses Pb (Pb(1), Pb(2) and Pb(3)), and the impulse driving operation cannot be performed appropriately.

That is, in the impulse driving operation, three selection pulses Pb (1), Pb(2) and Pb(3) are applied to the scan line GLj (see FIG. 1) as in the example shown in FIG. 7. In this case, the second selection pulse Pb (2), among the three selection pulses Pb (1), Pb(2) and Pb(3) applied, synchronizes with the timings (ts1 and ts2) at which the polarity of the data signal S(i) is inverted. However, the other selection pulses Pb (1) and Pb(3) do not synchronize with the timings (ts1 and ts2) at which the polarity of the data signal S(i) is inverted. Therefore, charge sharing is performed only at the timing at which this second selection pulse Pb (2) is generated. In this case, in the example shown in FIG. 8, charge sharing (short-circuiting of picture element electrodes) occurs only once for the scan line GLj. Therefore, the voltage applied to the picture element electrode (L(i,j) shown in FIG. 8) merely lowers and does not reach the black voltage.

The present invention has been made in view of the above problems, and has an object to provide a simple circuit with which an appropriate impulse driving operation can be performed in a multiple line inversion driving operation, while one can choose a driving operation in which an impulse driving operation is not performed in a multiple line inversion driving operation to thereby save the power consumption.

Solution to the Problem

In order to achieve at least one of the objects above, the configuration includes: a plurality of scan lines; a plurality of data lines crossing the plurality of scan lines; a plurality of picture element forming portions each corresponding to an intersection between a scan line and a data line, wherein a voltage is written to the picture element forming portion by a data signal applied to the data line while the scan line is selected; polarity inversion signal output means for outputting a polarity inversion signal which inverts a polarity of the data signal once in a first one of n iterations (n is an integer of 2 or more) of a horizontal blanking period, while inverting the polarity of the data signal twice in each of the remaining n−1 iterations; data signal output means for outputting a data signal whose polarity is inverted based on the polarity inversion signal; data line short-circuiting means for short-circuiting a plurality of the data lines together when inverting the polarity of the data signal; and selection signal output means for outputting a selection signal which selects a scan line in a write period during which the data signal is applied to the picture element forming portion, and which selects the scan line in synchronism with a timing of the short-circuiting before the once-selected scan line is selected again in a write period.

Moreover, the configuration may be such that the polarity inversion signal includes a polarity specifying signal for specifying the polarity of the data signal, and a reference specifying signal for specifying a reference timing for referencing the polarity specifying signal; and the data signal output means inverts the polarity of the data signal if the polarity specified by the polarity specifying signal at the reference timing is different from the polarity specified at the previous reference timing.

Moreover, the configuration may be such that the reference specifying signal is formed by a first pulse and a second pulse, the first pulse being obtained by inverting a voltage level twice in every horizontal blanking period, and the second pulse being obtained by inverting the voltage level twice before the first pulse at least in the n−1 iterations of the horizontal blanking period; and the polarity specifying signal is formed by a third pulse and an edge, the third pulse being obtained by inverting the voltage level once before the transition of the voltage level of the second pulse and transitioning the voltage level once before the transition of the voltage level of the first pulse, and the edge being obtained by transitioning the voltage level at a timing preceding the third pulse at a rate of once every n iterations of a horizontal scanning period.

Moreover, the configuration may be such that the polarity inversion signal output means outputs a signal having a pulse width as specified by predetermined pulse width specifying data. With this configuration, the polarity of the data signal and the timing of short-circuiting can be very easily adjusted as intended.

Moreover, the configuration may be such that the polarity inversion signal output means adjusts the pulse width by referencing the pulse width specifying data which is prerecorded on a memory. With this configuration, the timing of short-circuiting and the polarity of the present invention can be controlled only by changing the pulse width specifying data recorded on the memory, and it is possible to very easily control the timing of short-circuiting and the polarity.

Moreover, if the memory is formed by an EPROM, the setting can easily be changed at any time, e.g., when shipping from the factory or after the user has started using.

Moreover, the polarity inversion signal output means may be configured so that it is capable of stopping or allowing the output of the second pulse of the reference specifying signal and the third pulse of the polarity specifying signal. With this configuration, it is possible to choose between a multiple line inversion driving operation without an impulse driving operation and a multiple line inversion driving operation with an impulse driving operation.

Moreover, if the configuration is such that the output of the pulses can be stopped or allowed through an operation from outside the liquid crystal display device, it is possible to easily make the choice of settings described above even after the liquid crystal display device is completed.

Moreover, the method of controlling the polarity of the data signal and the timing of short-circuiting using the polarity specifying signal and the reference specifying signal as in the present invention can be implemented as a liquid crystal display method. Moreover, such a liquid crystal display device or method as described above may be implemented as a liquid crystal display device, or as a component thereof, e.g., a display control device for outputting the polarity specifying signal and the reference specifying signal, or a liquid crystal module including the display control device.

Advantages of the Invention

Therefore, even with a specification such that short-circuiting is performed upon polarity transition of the data signal, it is possible to perform the short-circuiting described above in every horizontal blanking period while performing a driving operation where the polarity is maintained over n successive iterations of the write period. Therefore, it is possible to perform the short-circuiting at an intended timing by selecting a scan line in synchronism with the timing of short-circuiting by using a selection signal, and it is thus possible to perform an impulse driving operation in a multiple line inversion driving operation. As a result, it is possible to display an image with a high image quality.

On the other hand, a multiple line inversion driving operation is a driving method used for reducing the power consumption. However, if the polarity is inverted in n−1 iterations of the horizontal blanking period while performing a multiple line inversion driving operation as described above, the power consumption increases upon such inversions. In view of this, the present invention is configured so that switching can be performed so as to invalidate the state where the polarity of the data signal is inverted twice in each of the n−1 iterations of the horizontal blanking period. If the state where the polarity of the data signal is inverted twice is invalidated, the configuration is such that the polarity of the data signal is transitioned at a rate of once every n iterations of the horizontal blanking period, thereby realizing a configuration where an impulse driving operation is not performed in a multiple line inversion driving operation, and thus performing a driving operation while reducing unnecessary power consumption.

As a result, with such a configuration, it is possible, with a simple circuit, to perform an appropriate impulse driving operation (a driving operation in which it is possible to apply an appropriate voltage corresponding to black display) in a multiple line inversion driving operation. Moreover, with such a configuration, it is possible to choose a driving operation in which the power consumption is reduced by not performing an impulse driving operation in a multiple line inversion driving operation.

BRIEF DESCRIPTION OF THE DRAWINGS

FIG. 1 A block diagram of a liquid crystal display device.

DESCRIPTION OF EMBODIMENTS

In the present invention, a multiple line inversion driving operation is realized in which one can choose between a mode of performing an appropriate impulse driving operation and another mode of performing a power-saving driving operation only by performing simple adjustments (adjustments using pulse width specifying data) in a display control circuit for controlling a source driver and a gate driver while employing general-purpose circuit configurations for the source driver and the gate driver.

Specifically, in the present invention, the display of the liquid crystal display device is controlled by controlling the polarity of the data signal applied to a plurality of picture element forming portions. The polarity inversion signal is output so that the polarity of the data signal is inverted once in the first one of n iterations (n is an integer of 2 or more) of the horizontal blanking period and the polarity of the data signal is inverted twice in each of the remaining n−1 iterations. That is, the present invention assumes a configuration where the data driver outputs a data signal whose polarity is inverted based on the polarity inversion signal. Then, with this configuration, the polarity inversion signal is a signal that inverts the polarity of the data signal once in the first one of the n iterations of the horizontal blanking period. Thus, the data signal output means can transition the polarity of the data signal at a rate of once every n iterations of the horizontal blanking period.

Moreover, the polarity inversion signal is also a signal that inverts the polarity of the data signal twice in each of the remaining n−1 iterations. Therefore, the data driver inverts the polarity twice in the n−1 iterations of the horizontal blanking period. Therefore, in addition to the polarity transitioning at a rate of once every n iterations of the horizontal blanking period, the polarity of the data signal is forcibly inverted twice also in the n−1 iterations of the horizontal blanking period. Therefore, the data signal is a signal whose polarity is maintained over n successive iterations of the write period but is transitioned twice during horizontal blanking periods between the write periods.

Embodiment 1

A liquid crystal display device of the present embodiment has substantially the same configuration as that of FIG. 1. That is, the display section 100, the data driver 300 and the gate driver 400 together form a liquid crystal module. The liquid crystal module, a display control circuit (display control device) 200, an I/F to be described later, a circuit (not shown), etc., together form a liquid crystal display device. Note however that the data driver 300 includes a similar circuit to that shown in FIG. 6, and the display control circuit 200 has a configuration that is characteristic of the present invention.

Figure 2:
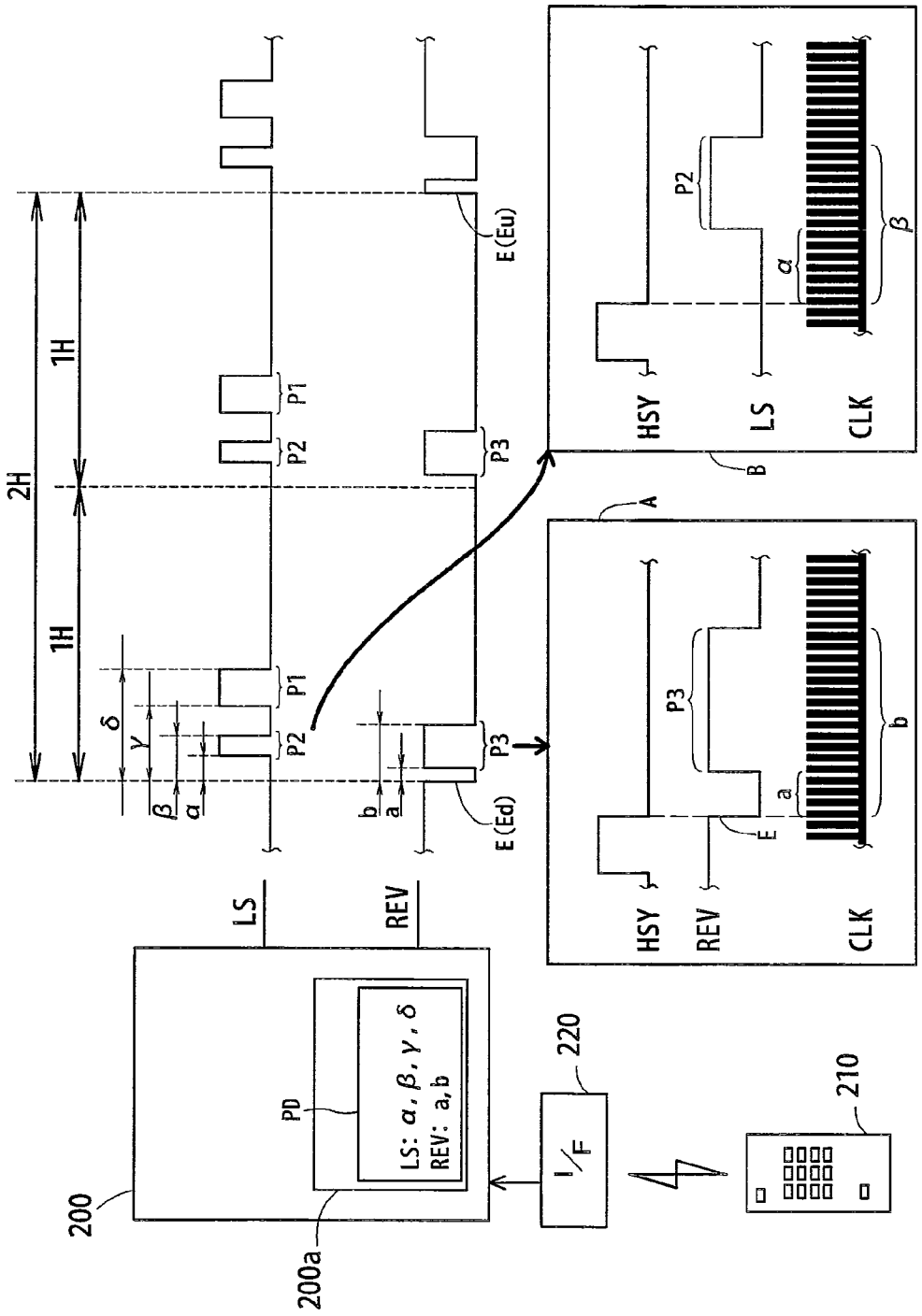
FIG. 2 A diagram showing a configuration of a display control circuit.

FIG. 2 is a diagram showing the display control circuit 200. The display control circuit 200 is a circuit for generating signals to be input to the data driver 300 and the gate driver 400. The display control circuit 200 controls the content to be displayed on the liquid crystal display device by appropriately adjusting signals input to the drivers. In the present embodiment, it is possible to switch control operations of the display control circuit 200 from one to another by receiving operations performed on a remote controller 210.

The display control circuit 200 is configured so that the pulse width specifying data PD to be referenced is specified by the remote controller 210. That is, the remote controller 210 includes an infrared signal output section (not shown), and the liquid crystal display device includes an interface (an I/F 220 shown in FIG. 2) for obtaining the infrared signal output from the infrared signal output section. The remote controller 210 is provided with a button for switching the pulse width specifying data PD to be referenced by the display control circuit 200 from one to another.

When this button is pressed, the remote controller 210 outputs an infrared signal containing an instruction for switching the pulse width specifying data PD to be referenced by the display control circuit 200 from one to another. When the infrared signal is obtained by the I/F 220, the display control circuit 200 switches the pulse width specifying data PD to be referenced from one to another based on this instruction. As a result, it is possible to choose between a mode where an appropriate impulse driving operation (a driving operation in which an appropriate voltage corresponding to black display can be applied) is performed in a multiple line inversion driving operation, and another mode where no impulse driving operation is performed in a multiple line inversion driving operation to thereby reduce the power consumption.

Hereinafter, the function of the display control circuit 200 will be described with reference to FIGS. 1 and 2. Various signals are input to the display control circuit 200 from external signal sources. The display control circuit 200 generates the polarity specifying signal REV which specifies the polarity of the data signal, and the reference specifying signal LS which specifies the timing for referencing the polarity specified by the polarity specifying signal. Then, the display control circuit 200 outputs the polarity specifying signal REV and the reference specifying signal LS to the data driver 300.

In the present embodiment, the display control circuit 200 is configured so as to adjust the pulse width (voltage transition timing) based on the pre-recorded pulse width specifying data PD. That is, the display control circuit 200 includes a memory 200a (e.g., EPROM) as shown in FIG. 2. The memory 200a stores the pulse width specifying data PD which specifies the width of the pulse output from the display control circuit 200.

The display control circuit 200 is configured so as to adjust the pulse width of each output signal by counting the number of pulses of the clock signal CLK described above over a predetermined time interval. FIG. 2 shows an example of the reference specifying signal LS and the polarity specifying signal REV, and also shows an example of pulse width adjustment by way of enlarged views showing the polarity specifying signal REV and the reference specifying signal LS together with the clock signal CLK and the horizontal sync signal HSY.

In the present embodiment, the pulse width specifying data PD for the reference specifying signal LS and the polarity specifying signal REV represent the number of pulses of the clock signal CLK to be counted in one horizontal scanning period (1H shown in FIG. 2). In the example shown in FIG. 2, $\alpha$, $\beta$, $\gamma$ and $\delta$ for the reference specifying signal LS and a and b for the polarity specifying signal REV are stored in the memory 200a as the pulse width specifying data PD. Note that the numbers of pulses $\alpha$, $\beta$, $\gamma$, $\delta$, a and b stored in the memory 200a each represent the number of pulses of the clock signal CLK, and have a relationship of ($0 < a < \alpha < \beta < b < \gamma < \delta$).

In the present embodiment, as shown in the enlarged views A and B of FIG. 2, for example, one horizontal scanning period (1H) is identified based on the period of the horizontal sync signal HSY described above. Then, the number of pulses of the clock signal CLK is counted, starting from the beginning of one horizontal scanning period (1H).

Then, the polarity of the reference specifying signal LS is inverted from L to H when the count value is equal to $\alpha$. The polarity of the reference specifying signal LS is inverted from H to L when the count value is equal to $\beta$. The polarity of the reference specifying signal LS is inverted from L to H when the count value is equal to $\gamma$. The polarity of the reference specifying signal LS is inverted from L to H when the count value is equal to $\delta$.

The display control circuit 200 counts the clock signal CLK, and the polarity of the polarity specifying signal REV is inverted from L to H (or from H to L) when the count value is equal to a. It is inverted from H to L (or from L to H) when the count value is equal to b.

That is, the display control circuit 200 identifies one horizontal scanning period (1H) based on the period of the horizontal sync signal HSY described above, as shown in FIG. 2. Then, the number of pulses of the clock signal CLK is counted, starting from the beginning of one horizontal scanning period (1H). For the polarity specifying signal REV, the voltage level of the signal is changed when the count value becomes equal to a or b, and the same process is repeated again upon elapse of one horizontal scanning period (1H) from the start of counting.

The enlarged view A of FIG. 2 shows, on an enlarged scale, a portion of the clock signal CLK and the polarity specifying signal REV. The display control circuit 200 counts the clock signal CLK from the beginning of one horizontal scanning period (1H), as shown in the enlarged view A. Then, when the value reaches a, the polarity of the polarity specifying signal REV is inverted at a timing thereafter synchronized with the clock signal CLK. The display control circuit 200 continues to count the clock signal CLK, and when the value reaches b, the polarity of the polarity specifying signal REV is inverted at a timing thereafter synchronized with the clock signal CLK.

As a result, the polarity specifying signal REV is a pulse signal as shown in the enlarged view A of FIG. 2. Note however that the present embodiment employs a driving method in which the polarity of the polarity specifying signal REV is transitioned at a rate of once every two horizontal scanning periods (2H) as shown in FIG. 2. This inverts the polarity of the voltage level at the start of counting every two horizontal scanning periods (2H). As a result, there appears a transition of the voltage level at a rate of once every two horizontal scanning periods (2H) as shown in FIG. 2. Note that the transition of the voltage level (the timing at which the polarity of REV transitions) is referred to as the edge E. The pulse generated corresponding to the count values a and b is referred to as the third pulse P3. The pulse width adjustment described above is an example, and it may be a configuration where the edge E is generated based on the pulse width specifying data, for example.

For the reference specifying signal LS, the display control circuit 200 changes the voltage level of the reference specifying signal LS when the count value of the clock signal CLK becomes equal to $\alpha$, $\beta$, $\gamma$ or $\delta$. The display control circuit 200 repeats the same process every horizontal scanning period (1H) since the start of counting.

That is, the enlarged view B of FIG. 2 shows, on an enlarged scale, a portion of the clock signal CLK and the reference specifying signal LS. The display control circuit 200 counts the clock signal CLK from the beginning of one horizontal scanning period (1H), as shown in the enlarged view B. Then, when the value reaches $\alpha$, the polarity of the reference specifying signal LS is inverted at a timing thereafter synchronized with the clock signal CLK. It further continues to count the clock signal CLK, and when the value reaches $\beta$, the polarity of the reference specifying signal LS is inverted at a timing thereafter synchronized with the clock signal CLK. Thus, one pulse P2 of the reference specifying signal LS is formed.

Moreover, it continues to count the clock signal CLK, and when the value reaches $\gamma$ since the start of counting, the polarity of the reference specifying signal LS is inverted at a timing thereafter synchronized with the clock signal CLK, as shown in FIG. 2. It further continues to count the clock signal CLK, and when the value reaches $\delta$, the polarity of the reference specifying signal LS is inverted at a timing thereafter synchronized with the clock signal CLK. Thus, another pulse P1 of the reference specifying signal LS is formed. As a result, the reference specifying signal LS is a pulse signal as shown in FIG. 2. Note that in the example shown in FIG. 2, the pulse generated corresponding to the count values $\gamma$ and $\delta$ is referred to as the first pulse P1, and the pulse generated corresponding to the count values $\alpha$ and $\beta$ is referred to as the second pulse P2.

In the example shown in FIG. 2, an instruction is made on the remote controller 210 for the switching of the pulse width specifying data. In this case, for the pulse width specifying data corresponding to the reference specifying signal LS, it is possible to switch between a state where data to be referenced as the number of pulses of the clock signal CLK is $\alpha$, $\beta$, $\gamma$ and $\delta$, and another state where the data is $\gamma$ and $\delta$. Therefore, in a state where $\alpha$, $\beta$, $\gamma$ and $\delta$ are referenced as the number of pulses of the clock signal CLK, the reference specifying signal LS is formed by the second pulse P2 and the first pulse P1. In a state where $\gamma$ and $\delta$ are referenced as the number of pulses of the clock signal CLK, the reference specifying signal LS is formed by the first pulse P1 (i.e., the second pulse P2 does not appear).

An instruction is made on the remote controller 210 as described above for the switching of the pulse width specifying data. In this case, for the pulse width specifying data corresponding to the polarity specifying signal REV, it is possible to switch between a state where a and b are referenced as the number of pulses of the clock signal CLK, and another state where the numbers of pulses a and b of the clock signal CLK are not referenced. Therefore, in a state where a and b are referenced as the number of pulses of the clock signal CLK, the polarity specifying signal REV is formed by the edge E and the third pulse P3. In a state where a and b are not referenced as the number of pulses of the clock signal CLK, the polarity specifying signal REV is formed by the edge E (the third pulse P3 does not appear).

Thus, in the present embodiment, the pulse of the reference specifying signal LS and the pulse of the polarity specifying signal REV can each be changed by switching the pulse width specifying data PD.

Note that in the present embodiment, a state where the display control circuit 200 references the numbers of pulses $\alpha$, $\beta$, $\gamma$ and $\delta$ of the clock signal CLK for the reference specifying signal LS and the display control circuit 200 references the numbers of pulses a and b of the clock signal CLK for the polarity specifying signal REV is referred to as the "high image quality mode". A state where it references $\gamma$ and $\delta$ as the numbers of pulses of the clock signal CLK for the reference specifying signal LS and does not reference a and b as the number of pulses of the clock signal CLK for the polarity specifying signal REV is referred to as the "power-saving mode".

The reference specifying signal LS and the polarity specifying signal REV are generated as described above. The display control circuit 200 generates and outputs other signals (DA, SSP, SCK, GCK, GSP, GOE (see FIG. 1)). In this process, the display control circuit 200 generates these other signals based on the pulse width specifying data (not shown) recorded on the memory 200a and signals Dv, HSY, VSY and CLK (see FIG. 1).

That is, in the present embodiment, the display control circuit 200 receives the signals Dv, HSY, VSY and CLK as shown in FIG. 1. Here, the signal Dv is a digital video signal representing an image to be displayed. The signal HSY is a horizontal sync signal corresponding to the digital video signal Dv. The signal VSY is a vertical sync signal corresponding to the digital video signal Dv. The signal CLK is a clock signal for controlling the pulse width. Then, the display control circuit 200 generates and outputs the digital image signal DA, the data start pulse signal SSP, the data clock signal SCK, the gate clock signal GCK, the gate start pulse signal GSP and the gate driver output control signal GOE based on these signals Dv, HSY, VSY and CLK and the pulse width specifying data (not shown).

Note that the digital image signal DA shown in FIG. 1 is a signal for identifying the voltage level of the data signal in the data driver 300, and a signal corresponding to the digital video signal Dv. The data clock signal SCK is generated as a signal formed by pulses corresponding to picture elements of an image represented by the digital image signal DA. The data start pulse signal SSP is a signal that is at high level (H) for a predetermined period of time in every horizontal scanning period (1H). The gate start pulse signal GSP is a signal that is at high level (H) for a predetermined period of time in every frame period (1 vertical scanning period). The gate clock signal GCK is a signal in synchronism with the horizontal sync signal HSY. The gate driver output control signal GOE (GOE1 to GOEq) is a signal representing the timing for outputting a selection signal for selecting a scan line.

It is understood that the above configuration is only an example, and is subject to various modifications. For example, it is possible to employ a configuration where the predetermined period of time for which the gate start pulse signal GSP is at high level (H) varies from frame to frame, or a configuration where the phase between the gate clock signal GCK and the horizontal sync signal HSY is transitioned from line to line.

The data driver 300 shown in FIG. 1 successively generates data signals S(1) to S(n), one for every horizontal scanning period (1H) based on the digital image signal DA, the data start pulse signal SSP and the data clock signal SCK. The data signals S(1) to S(n) each correspond to a voltage to be applied to each picture element for producing an image represented by the digital image signal DA. The data driver 300 applies these data signals S(1) to S(n) to the data lines SL1 to SLn, respectively. In the present embodiment, the polarity of the voltage applied across the liquid crystal layer is inverted every frame period. Within each frame, the polarity of the data signals S(1) to S(n) is inverted every two scan lines and one data line. The present embodiment employs a driving method in which such data signals S(1) to S(n) are output.

Therefore, the polarity of the polarity specifying signal REV described above is inverted at a rate of once every two horizontal scanning periods (2H) as shown in FIG. 2. Then, the edge E of the polarity specifying signal REV is a rising edge (Eu) or a falling edge (Ed) at a rate of once every two horizontal scanning periods (2H). As shown in FIGS. 1 and 2, the data driver 300 inverts, from data line to data line, the polarity of the data signal S(i) applied to the data lines SL1 to SLn (see FIG. 1) based on the change of the polarity of the polarity specifying signal REV specified by the edge E (see FIG. 2). The data driver 300 also inverts the polarity of the data signal S(i) applied to the data line SLi (i=1, 2, . . . , n) at a rate of once every two write periods WR (see, for example, FIG. 3).

Figure 6:
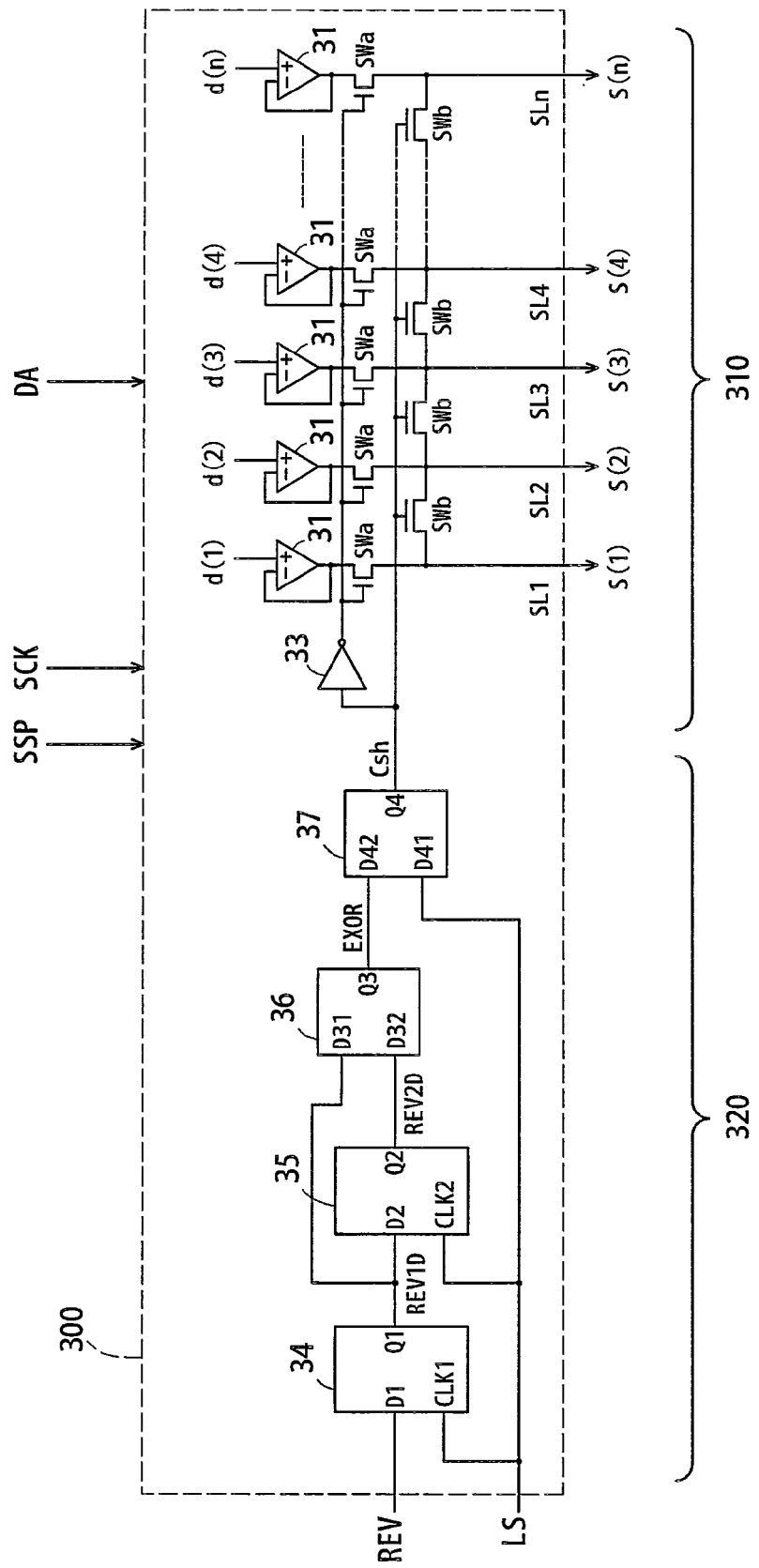
FIG. 6 A diagram showing a configuration of a data driver.

The data driver 300 includes a similar circuit to that of FIG. 6 described above. Therefore, the data driver 300 employs a charge sharing method in which a plurality of data lines are short-circuited together when the polarity of the data signals S(1) to S(n) is inverted so as to reduce the power consumption. The present embodiment employs a specification such that charge sharing is not performed when the polarity of the data signal S(i) is not inverted, and charge sharing is performed only at a timing at which the polarity of the data signal S(i) is inverted.

Next, an operation of a circuit having such a configuration will be described based on a timing diagram. The timing diagram in the power-saving mode described above is similar to that of FIG. 7 described above. On the other hand, in the high image quality mode, it is possible to perform an appropriate impulse driving operation by using the timing control section 320 while maintaining the write polarity of the data signal S(i) over two successive iterations of the write period.

Figure 3:
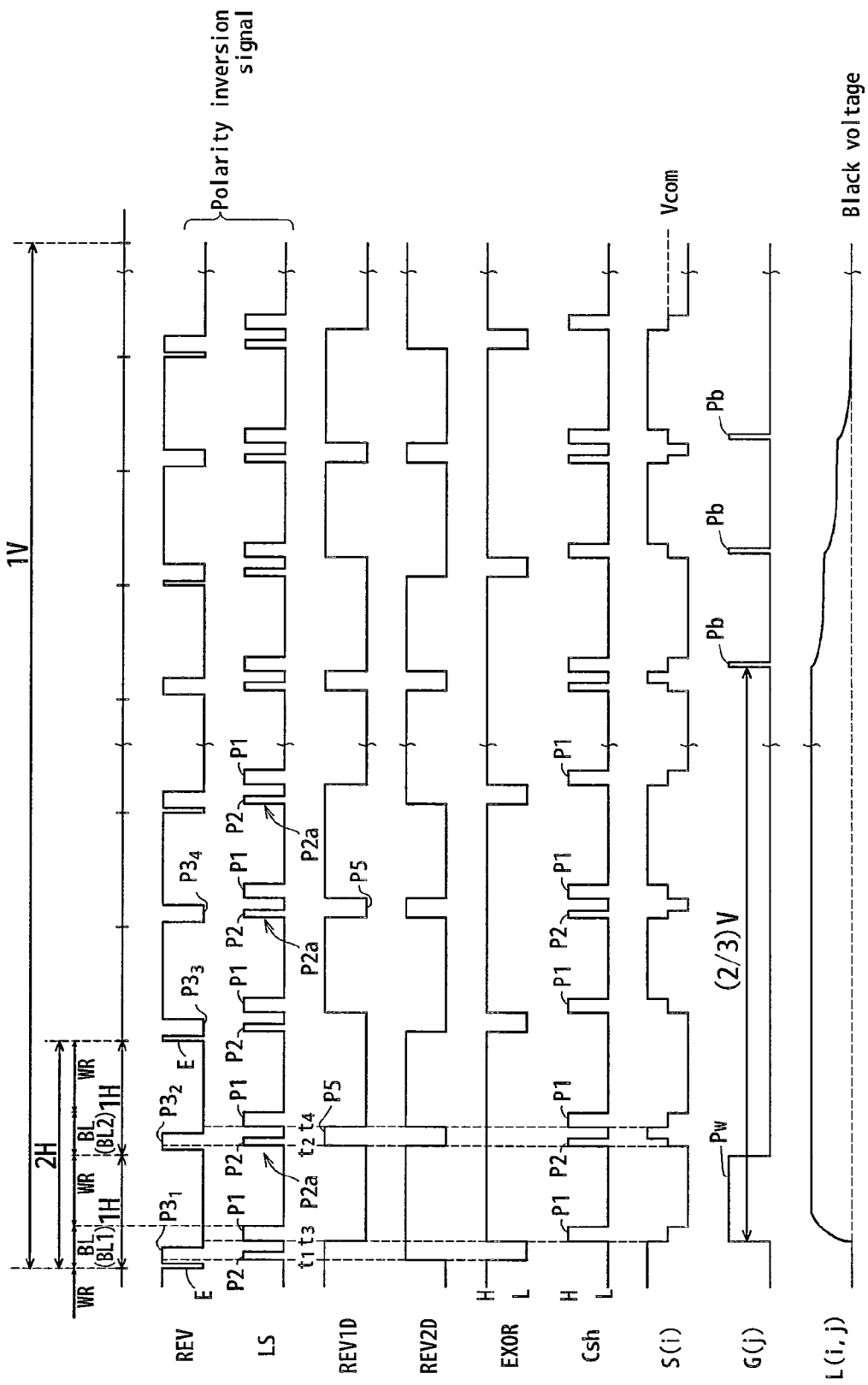
FIG. 3 A timing diagram of various signals.

Hereinafter, an operation of driving a liquid crystal display device in the high image quality mode described above will be described. FIG. 3 is a timing diagram of various signals in the high image quality mode. In the high image quality mode, the reference specifying signal LS is formed by the first pulse P1 and the second pulse P2 as described above. Therefore, the reference specifying signal LS has a signal waveform such that the first pulse P1 and the second pulse P2 appear within one horizontal scanning period (1H) as shown in FIG. 3.

Here, the first pulse P1 is a pulse appearing on the reference specifying signal LS based on the numbers of pulses $\gamma$ and $\delta$ of the clock signal CLK indicated by the pulse width specifying data. The first pulse P1 appears in every horizontal blanking period BL, and the voltage level is inverted twice in each horizontal blanking period BL.

The second pulse P2 is a pulse appearing on the reference specifying signal LS based on the numbers of pulses $\alpha$ and $\beta$ of the clock signal CLK indicated by the pulse width specifying data. The second pulse P2 appears in every horizontal blanking period BL.

In the present embodiment, $0<\alpha<\beta<\gamma<\delta$. Therefore, the second pulse P2 appears prior to the first pulse P1 within one horizontal scanning period (1H). In the present embodiment, the second pulse P2 appears in every horizontal blanking period BL. The reference specifying signal LS is formed by the first pulse P1 and the second pulse P2 which appear as described above.

In contrast, the polarity specifying signal REV is formed by the third pulse P3 and the edge E.

The third pulse P3 is a pulse appearing on the polarity specifying signal REV based on the numbers of pulses a and b of the clock signal CLK. In the present embodiment, the numbers of pulses of the clock signal CLK indicated by the pulse width specifying data are set so that $0<a<\alpha<\beta<b<\gamma<\delta$ (see FIG. 2). Therefore, within one horizontal scanning period (1H), the third pulse P3 appears on the polarity specifying signal REV before the second pulse P2 appears on the reference specifying signal LS. Then, the third pulse P3 disappears after the second pulse P2 disappears and before the first pulse P1 appears.

Therefore, the third pulse P3 is a pulse whose voltage level is inverted once before the transition of the voltage level of the second pulse P2, and inverted once before the transition of the voltage level of the first pulse. Moreover, the edge E of the polarity specifying signal REV is a transition of the voltage level appearing when the count value of the clock signal CLK is equal to 0 at a rate of once every two horizontal scanning periods (2H) as described above. The edge E is set to 0<a in terms of the number of pulses of the clock signal CLK. Therefore, the edge E appears at a timing prior to the appearance of the third pulse P3.

The polarity specifying signal REV is formed by the third pulse P3 and the edge E which appear as described above. Therefore, the polarity specifying signal REV has a signal waveform such that the third pulses P3 are included between the edges E whose polarity is inverted every two horizontal scanning periods (2H) as shown in FIG. 3.

Note that the configuration may be such that the second pulse P2 does not appear at a rate of once every two iterations of the horizontal blanking period BL (once every n iterations) as in an embodiment shown in FIG. 5 to be described later. Therefore, the second pulse P2 may be a pulse which appears as the voltage level is inverted twice in at least n−1 iterations of the horizontal blanking period BL. The third pulse P3 may appear corresponding to the second pulse P2. In this sense, the third pulse P3 may appear as the voltage level is inverted twice in at least n−1 iterations of the horizontal blanking period BL, as does the second pulse P2.

In FIG. 3, the third pulses P3 are numbered successively starting from near the rise of one edge E, and are denoted as $P3_1, P3_2, P3_3, P3_4, \ldots$. Here, $P3_1, P3_3, \ldots$, are referred to also as odd-numbered third pulses, and $P3_2, P3_4, \ldots$, as even-numbered third pulses. With such a configuration, there is a rise or a fall of the edge E immediately before an odd-numbered third pulse P3$_1$, P3$_3$, . . . . There is no rise or fall of the edge immediately before an even-numbered third pulse P3$_2$, P3$_4$, . . . .

The polarity specifying signal REV and the reference specifying signal LS are input to the data driver 300 as shown in FIG. 1.

In the data driver 300, the D flip flop 34 of the timing control section 320 references the polarity specifying signal REV at a timing synchronized with the rise of the reference specifying signal LS. In this case, the voltage level after the rise of the odd-numbered third pulse P3$_1$, P3$_3$, . . . , of the polarity specifying signal REV is the same as that before the voltage transition due to the edge E immediately before as shown in FIG. 3. Moreover, there is no edge E immediately before the even-numbered third pulse P3$_2$, P3$_4$, . . . , of the polarity specifying signal REV as shown in FIG. 3.

Therefore, when the D flip flop 34 references the voltage level of the odd-numbered third pulse P3$_1$, P3$_3$, . . . , in response to the rise of the second pulse P2 (e.g., the timing t$_1$ shown in FIG. 3), the voltage level of the output signal REV1D of the D flip flop 34 does not change. In contrast, when the D flip flop 34 references the voltage level of the even-numbered third pulse P3$_2$, P3$_4$, . . . , in response to the rise of the second pulse P2 (e.g., the timing t$_2$ shown in FIG. 3), the voltage level of the output signal REV1D of the D flip flop 34 changes.

When the D flip flop 34 references the voltage level of the edge E in response to the rise of the first pulse P1 (e.g., timings t$_3$ and t$_4$ shown in FIG. 3), the voltage level of the output signal REV1D of the D flip flop 34 changes. Therefore, as compared with the output signal REV1D in the power-saving mode shown in FIG. 7, the output signal REV1D in the high image quality mode shown in FIG. 3 has a waveform in which a pulse (the pulse P5 between the timings t$_2$ and t$_4$ shown in FIG. 3) is inserted at a rate of once every two horizontal scanning periods (2H).

As described above, the D flip flop 34 references the polarity specifying signal REV in response to the rise of the second pulse P2 and the first pulse P1. Thus, the polarity of the output signal REV1D is inverted once in the horizontal blanking period BL (BL1) where there is an odd-numbered third pulse P3$_1$, P3$_3$, . . . , and inverted twice in the horizontal blanking period BL (BL2) where there is an even-numbered third pulse P3$_2$, P3$_4$, . . . . That is, the polarity of the output signal REV1D is inverted when the polarity specified by the polarity specifying signal REV at a reference timing indicated by a rise of the reference specifying signal LS is different from the polarity specified by the polarity specifying signal REV at a reference timing indicated by the previous rise (one before the present) of the reference specifying signal LS.

The D flip flop 35 references the output signal REV1D at a timing synchronized with the rise of the second pulse P2 and the first pulse P1 of the reference specifying signal LS. Then, it outputs the output signal REV2D whose voltage level is controlled according to the voltage level of the output signal REV1D immediately before the reference timing. Thus, it outputs the output signal REV2D whose voltage level is transitioned at timings t$_1$, t$_2$ and t$_4$ and maintained at a timing t$_3$. As a result, the output signal REV2D of the D flip flop 35 is a signal obtained by delaying the output signal REV1D by two horizontal scanning periods (2H)-(t$_3$-t$_1$).

As a result, in the high image quality mode, the output signal REV1D and the output signal REV2D share an equal voltage level between the timing t$_3$ and the timing t$_1$, and have different voltage levels at other timings, within two horizontal scanning periods, as shown in FIG. 3. Therefore, the EXOR circuit 36 outputs a signal that is at low level (L) between the timing t$_3$ and the timing t$_1$ and at high level (H) at other timings. That is, the output of the EXOR circuit 36 is at low level (L) within a horizontal blanking period where there is an odd-numbered third pulse P3$_1$, P3$_3$, . . . .

The second pulse P2 is included between the timing t$_3$ and the timing t$_1$. The AND circuit 37 takes an AND between the output signal of the EXOR circuit 36 and the reference specifying signal LS as shown in FIG. 6. Thus, the AND circuit 37 blocks the second pulse P2 of the reference specifying signal LS between the timing t$_3$ and the timing t$_1$, and allows the reference specifying signal LS to pass at the other timings, as shown in FIG. 3. Thus, in the output of the AND circuit 37, the other second pulses P2 are blocked at timings corresponding to the odd-numbered third pulses P3$_1$, P3$_3$, . . . . The second pulse P2 (P2$a$) passes at timings corresponding to the even-numbered third pulses P3$_2$, P3$_4$, . . . . Moreover, all the first pulses P1 are allowed to pass. Thus, the charge sharing control signal Csh as the output of the AND circuit 37 has a signal waveform obtained by combining together second pulses P2$a$ allowed to pass at timings corresponding to the even-numbered third pulses P3$_2$, P3$_4$, . . . , and all the first pulses P1.

Also in the high image quality mode, the data driver 300 generates an analog signal (here, the analog voltage signal d(i)) based on the digital image signal DA as shown in FIG. 6. Here, the voltage level of the analog voltage signal d(i) is controlled by a circuit (not shown) so as to have a polarity as indicated by the output signal REV1D. Then, at a timing indicated by the charge sharing control signal Csh, the data driver 300 performs the charge sharing described above. Therefore, the data signal S(i) has such a waveform as shown in FIG. 3. The polarity of the data signal S(i) is inverted at a rate of once every two iterations of the horizontal blanking period BL. Moreover, in a horizontal blanking period BL different from the horizontal blanking period BL where the polarity is inverted once, the polarity of the data signal S(i) is inverted twice and charge sharing is performed upon each polarity inversion. Thus, the polarity of the data signal S(i) is controlled by the output signal REV1D. The polarity specifying signal REV and the reference specifying signal LS for generating the output signal REV1D correspond to the "polarity inversion signal" as used in the claims.

Figure 7:
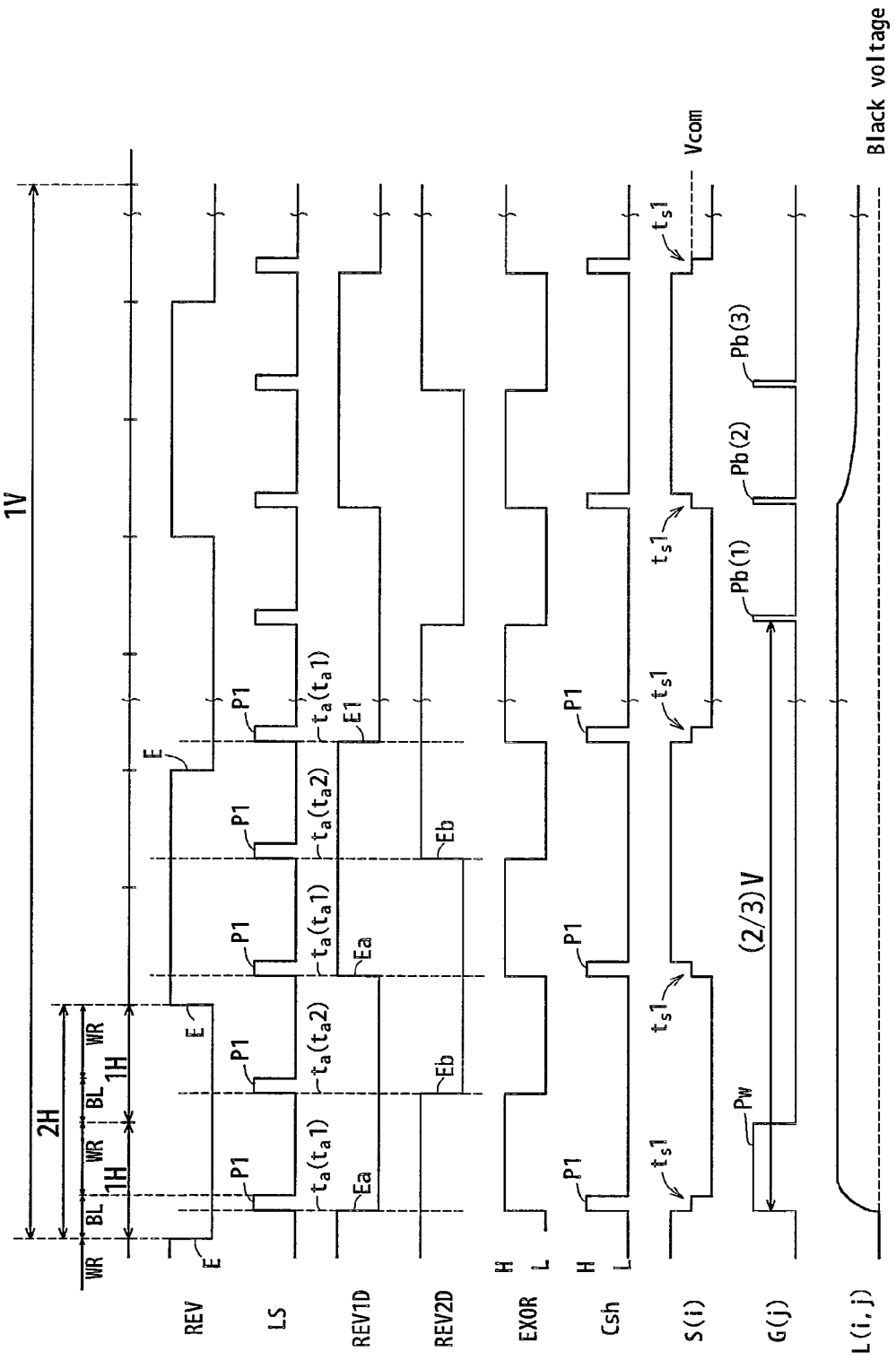
FIG. 7 A timing diagram of various signals.
Figure 8:
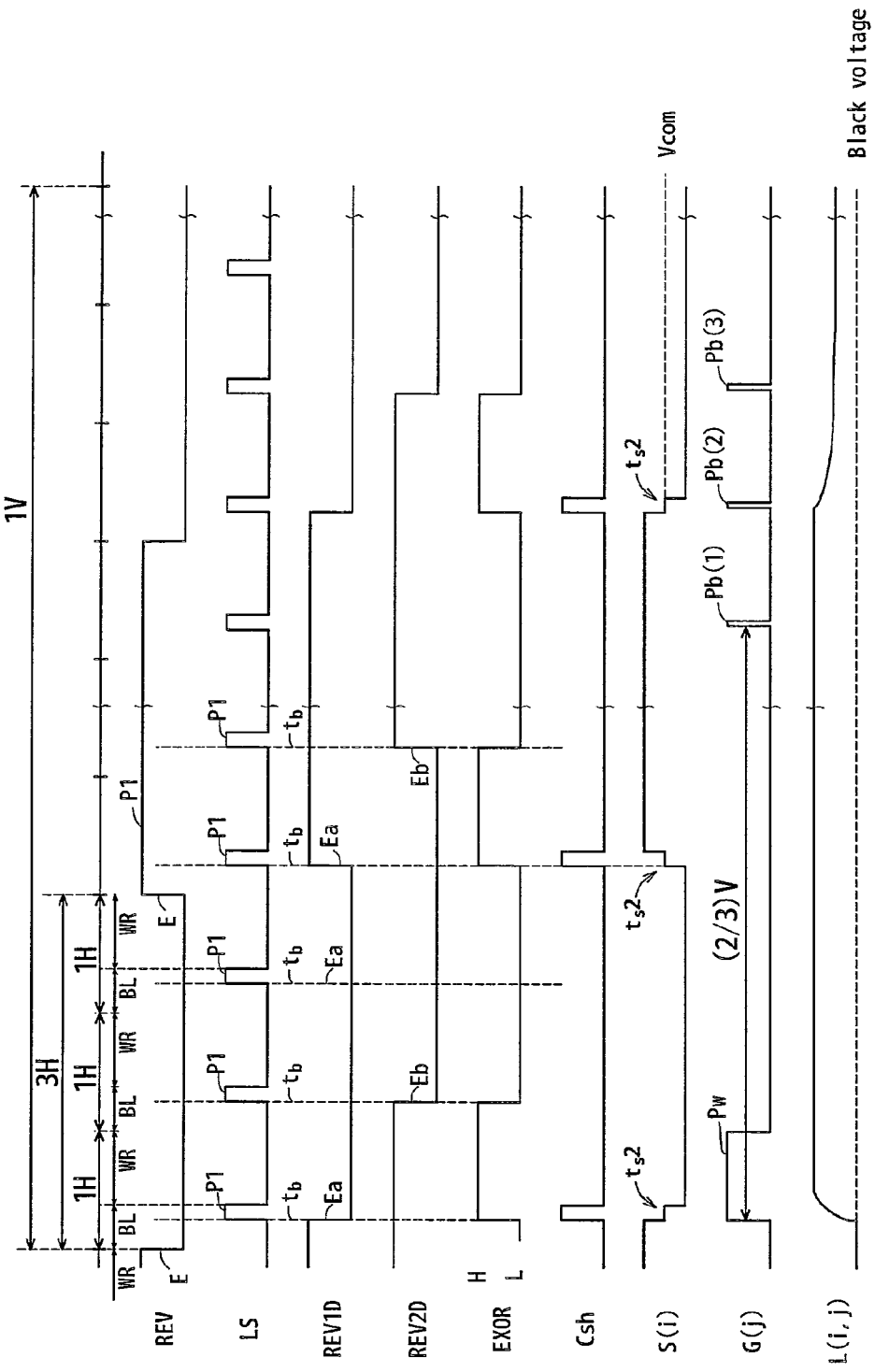
FIG. 8 A timing diagram of various signals.

Note that in the high image quality mode, the signal waveforms of the output signal REV1D and the charge sharing control signal Csh as shown in FIG. 3 are different from those shown in FIG. 7. Therefore, the data signal S(i) of FIG. 3 also has a different signal waveform from that shown in FIG. 7. Charge sharing occurs when the charge sharing control signal Csh is at high level (H). Therefore, in the high image quality mode shown in FIG. 3, charge sharing is also performed at the timings t$_2$ and t$_4$ in addition to charge sharing performed at the timing t$_3$ (the same timing as that of charge sharing in the power-saving mode).

Therefore, in the high image quality mode, it is possible to average out the voltages of picture element electrodes at any timing synchronized with the first pulse P1 of the reference specifying signal LS by selecting a scan line with a selection signal synchronized with the reference specifying signal LS. Thus, in the high image quality mode, the gate driver 400 generates the selection pulse Pw and the selection pulse Pb as shown in FIGS. 1 and 3. Then, the gate driver 400 appropriately realizes successive scanning of the scan lines GL1 to GLm and the impulse driving operation by applying the selection pulse Pw and the selection pulse Pb to the scan lines. Here, the selection pulse Pw successively selects the scan lines GL1 to GLm, one for every write period WR. In a horizontal blanking period BL after the elapse of a predetermined period of time (⅔V, 1V: one frame period in this embodiment) since the selection of a scan line in the write period WR, the selection pulse Pb selects the scan line.

That is, the gate driver 400 is configured to output selection signals G(j) (see FIG. 3) to scan lines GLj (j=1, 2, ..., m). Then, the picture element forming portions 101 are selected along the scan line GLj where the selection pulse Pw is applied. Then, the TFTs 10 (TFTs: thin film transistors) connected to the selected scan line GLj are turned ON. Then, the data signals S(i) are applied to the picture element forming portions 101 along the selected scan line GLj.

On the other hand, after the elapse of a predetermined period of time (e.g., ⅔V) since the rise of the selection pulse Pw within one frame period (1V), the selection pulse Pb is successively applied a plurality of times at timings synchronized with the reference specifying signal LS. Thus, the TFTs 10 are turned ON in synchronism with all the selection pulses Pb, thereby averaging out the voltages of the picture element electrodes of the picture element forming portions 101 along the selected scan line GLj. Thus, charge sharing is performed at timings of occurrence of all the selection pulses Pb, and it is therefore possible to perform an appropriate impulse driving operation. For example, the voltage of the TFT 10 gradually decreases to the black voltage level as indicated by L(i,j) shown in FIG. 3.

As described above, in the present embodiment, pulse widths of the polarity specifying signal REV and the reference specifying signal LS output from the display control circuit 200 are adjusted as shown in FIG. 3. Thus, the polarity of the data signal S(i) is forcibly inverted twice in the horizontal blanking period BL while maintaining the polarity of the data signal S(i) over two successive iterations of the write period WR. Therefore, an impulse driving operation by charge sharing can be appropriately realized even with such a specification that charge sharing is performed only at timings when the polarity of the data signal S(i) is inverted while not performing charge sharing when the polarity of the data signal S(i) is not inverted.

The pulse width adjustment described above can be performed using pulse width specifying data recorded on the memory 200a, and it is possible using the remote controller 210 to easily switch data to be referenced from one to another in the pulse width specifying data. Therefore, it is possible to switch between the power-saving mode and the high image quality mode by a very simple operation of pressing a button on the remote controller 210.

Embodiment 2

The embodiment above is an example of how the present invention is carried out. Various other embodiments can be employed as long as it is possible to perform both an impulse driving operation and a driving operation of inverting the polarity of the data signal S(i) at a rate of once every two write periods WR while using the timing control section 320 which performs charge sharing only at timings when the polarity of the data signal S(i) (see FIG. 3) is inverted. For example, while data to be referenced in the pulse width specifying data recorded on the memory 200a is switched from one to another by the remote controller 210 in the embodiment above, the switching may be done by means other than the remote controller 210.

For example, the memory 200a may be formed by an EPROM, and the pulse width specifying data to be referenced may be set when shipping the liquid crystal display device. This makes it possible to switch the specification of the same liquid crystal display device between the power-saving specification and the high image quality specification. It is understood that the pulse width specifying data recorded on the memory 200a may be configured for either the power-saving specification or the high image quality specification so that the driving operation is performed with either specification.

Embodiment 3

Moreover, while charge sharing is performed by short-circuiting a plurality of data lines together in the embodiment above, the present invention is not limited to this. For example, although not shown in the figures, there may be provided a power source that is connected to a plurality of data lines during charge sharing so as to stabilize the voltage level during charge sharing.

Embodiment 4

Figure 4:
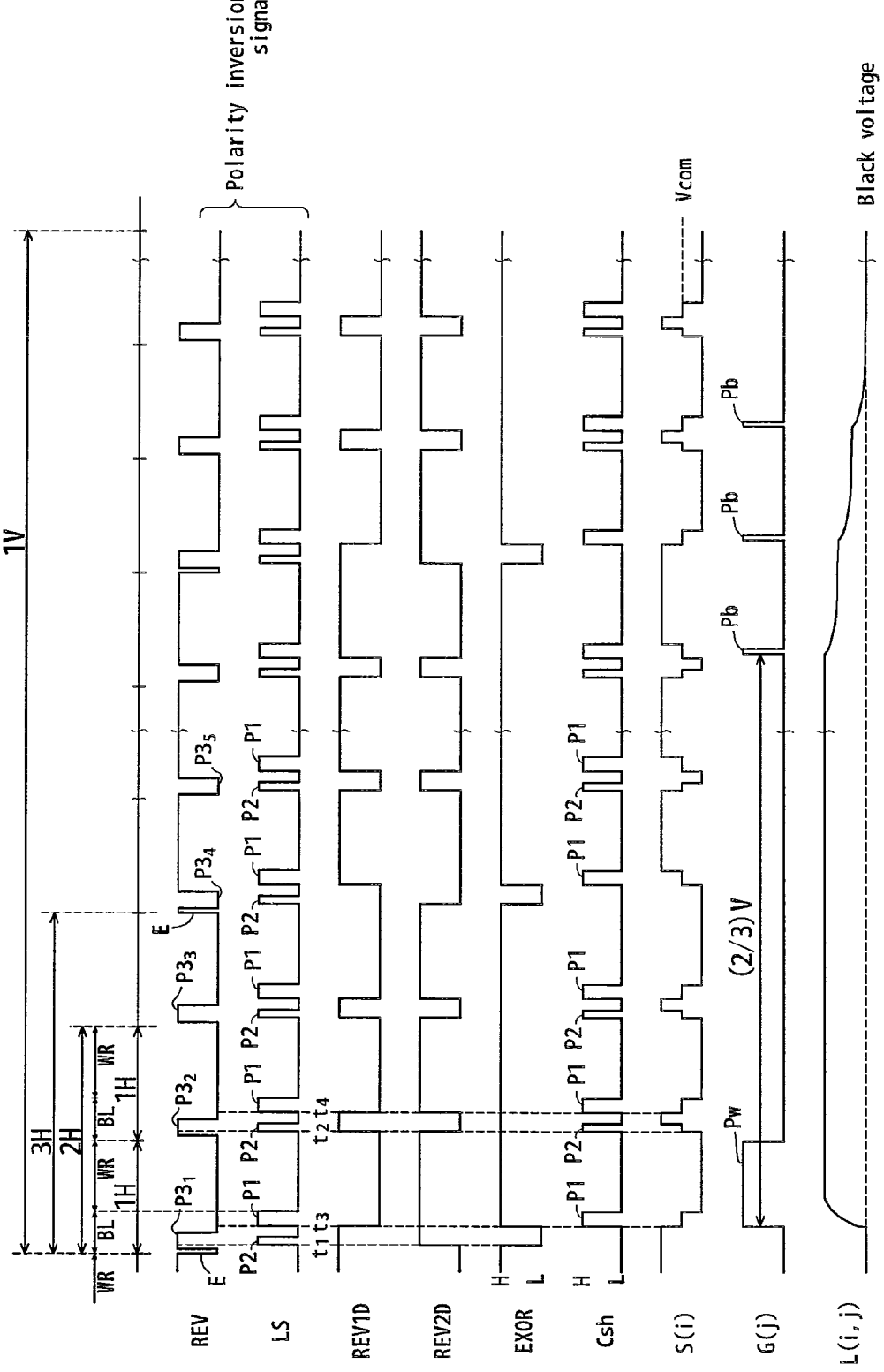
FIG. 4 A timing diagram of various signals.

While the example described above is directed to a driving method in which the polarity of the data signal is inverted at a rate of once every two write periods WR, the cycle with which the polarity of the data signal is inverted may be any cycle as long as it is two horizontal scanning periods (2H) or more. For example, the present invention can be carried out with a configuration where the polarity of the data signal in the write period WR is inverted at a rate of once every three horizontal scanning periods (3H). In this case, a voltage level according to the pulse width specifying data shown in FIG. 2 may be generated while employing a configuration where the polarity of the polarity specifying signal REV is changed at a rate of once every three horizontal scanning periods (3H) (the polarity is changed at the edge E at a rate of once every three horizontal scanning periods (3H)). In this case, the polarity inversion signal (the polarity specifying signal REV and the reference specifying signal LS) is as shown in FIG. 4. With the polarity inversion signal shown in FIG. 4 (the polarity specifying signal REV and the reference specifying signal LS), it is possible to perform charge sharing corresponding to all the selection pulses Pb.

That is, the polarity specifying signal REV and the reference specifying signal LS shown in FIG. 4 are input to the timing control section 320 (see FIG. 6). In this case, the D flip flop 34 does not invert the polarity at the rise of the second pulse P2 (timing $t_1$) at the first timing of the three horizontal scanning periods (3H) as shown in FIGS. 4 and 6. The D flip flop 34 outputs the output signal REV1D whose polarity is transitioned thereafter at the rising timings of the first pulse P1 and the second pulse P2.

On the other hand, the D flip flop 35 inverts the polarity at the rise of the second pulse P2 (timing $t_1$) at the first timing of the three horizontal scanning periods (3H). The D flip flop 35 outputs the output signal REV2D whose polarity is not inverted at the rise of the first pulse P1 (timing $t_3$) thereafter, and is transitioned at the rising timings of the first pulse P1 and the second pulse P2 thereafter.

Therefore, also in this example, the voltage level of the output signal REV1D and that of the output signal REV2D coincide with each other between the timing $t_3$ and the timing $t_1$ while being different from each other at other timings. Thus, the signal output from the EXOR circuit 36 is at low level (L) between the timing $t_3$ and the timing $t_1$ and at high level (H) at other timings, as shown in FIG. 4. As a result, the AND circuit 37 blocks the second pulse P2 and allows the first pulse P1 to pass at the first timing of the three horizontal scanning periods (3H). The AND circuit 37 allows the second pulse P2 and the first pulse P1 to pass at other timings. As a result, the charge sharing control signal Csh output from the AND circuit 37 is formed by a signal obtained by, for every three horizontal scanning periods (3H), blocking the second pulse P2 while allowing the first pulse P1 to pass in the first horizontal scanning period (1H), and by allowing the second pulse P2 and the first pulse P1 to pass in the following two horizontal scanning periods (2H).

On the other hand, the voltage level (polarity) of the analog voltage signal d(i) and the data signal S(i) is controlled so as to change in synchronism with the output signal REV1D.

As a result, for the data signal S(i), charge sharing can be performed in the horizontal blanking period BL of every horizontal scanning period. Thus, it is possible to perform charge sharing at every one of the successively-generated selection pulses Pb, and to perform an appropriate impulse driving operation. As described above, the timing for inverting the polarity of the data signal S(i) is not limited to two horizontal scanning periods (2H), but may be a longer cycle (e.g., three horizontal scanning periods (3H)). It is understood the polarity may be inverted every frame instead of inverting the polarity every n scan lines.

Embodiment 5

Moreover, in the high image quality mode, there is no limitation as long as it is possible to maintain the polarity of the data signal S(i) over a plurality of write periods WR while performing charge sharing by inverting the polarity of the data signal S(i) in the horizontal blanking period BL. The signal waveforms of the polarity specifying signal REV and the reference specifying signal LS for this purpose are not limited to those shown in FIG. 3.

For example, it is possible to employ a configuration where the polarity of the data signal S(i) is maintained over two successive iterations of the write period WR while generating the second pulse P2 and the third pulse P3 only in the horizontal blanking period BL between these write periods WR. For this, the clock signal CLK (see FIGS. 1 and 6) can be counted over two horizontal scanning periods (2H) in the display control circuit 200, for example. Then, pulse width specifying data may be defined and recorded on the memory 200a (see FIG. 2) such that the third pulse P3 and the first pulse P1 and the second pulse P2 are generated on the polarity specifying signal REV and the reference specifying signal LS, respectively, at such timings as shown in FIG. 5.

Figure 5:
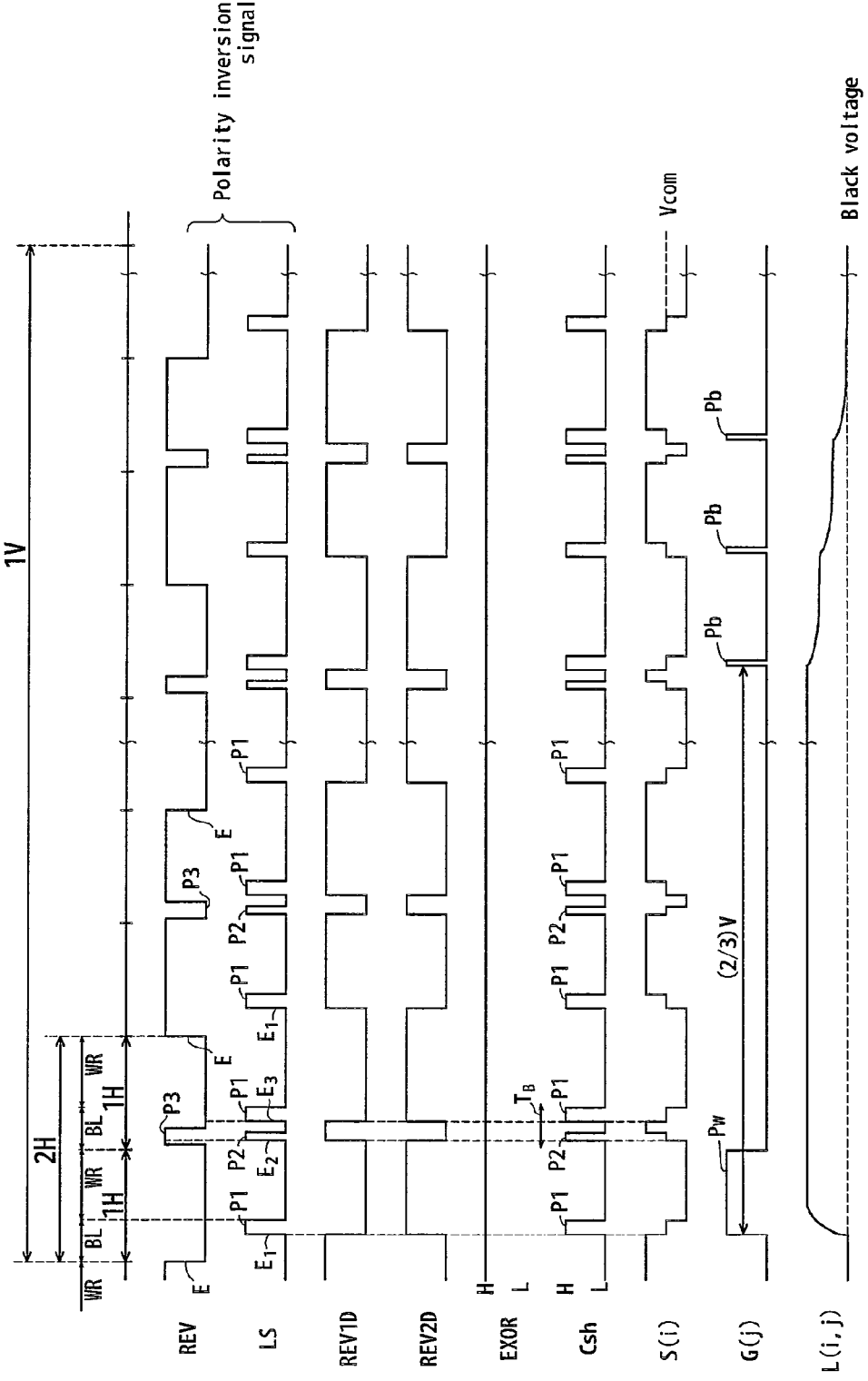
FIG. 5 A timing diagram of various signals.

With such a configuration, the polarity specifying signal REV and the reference specifying signal LS are generated as shown in FIG. 5. Then, the polarity specifying signal REV and the reference specifying signal LS are input to the timing control section 320 as shown in FIG. 6. Thus, the D flip flop 34 outputs the output signal REV1D. The output signal REV1D has its polarity changed in response to the rise $E_1$ of the first pulse P1 at a rate of once every two horizontal scanning periods (2H) as shown in FIG. 5. Moreover, the output signal REV1D has its polarity changed twice in response to the rises $E_2$ and $E_3$ of the second pulse P2 and the first pulse P1 between the rises $E_1$ described above. Moreover, the D flip flop 35 (see FIG. 6) outputs the output signal REV2D obtained by inverting the output signal REV1D as shown in FIG. 5.

As a result, the EXOR circuit 36 (see FIG. 6) outputs the signal EXOR which is always at high level (H) as shown in FIG. 5. The AND circuit 37 (see FIG. 6) outputs the charge sharing control signal Csh obtained by allowing all of the reference specifying signal LS to pass (see FIG. 5). The charge sharing control signal Csh is formed by the first pulse P1 in the first horizontal blanking period BL of the two horizontal scanning periods (2H), and by the second pulse P2 and the first pulse P1 in the following horizontal blanking period BL.

Therefore, for the data signal S(i), the polarity is inverted and charge sharing is performed at a rate of once every two iterations of the horizontal blanking period BL. In the horizontal blanking period between polarity inversions ($T_B$ shown in FIG. 5), the polarity is inverted twice and charge sharing is performed. Therefore, it is possible to perform charge sharing in the horizontal blanking period BL in every horizontal scanning period. Thus, as shown in FIG. 5, it is possible to perform charge sharing in all of the successively-generated selection pulses Pb and to perform an appropriate impulse driving operation.

Embodiment 6

Moreover, in the present invention, the circuit configuration of the timing control section 320 is not limited to the configuration shown in FIG. 6. For example, the polarity of the data signal S(i) may be determined by the polarity specifying signal REV indicating the polarity of the data signal S(i) during the write period WR and the reference specifying signal LS indicating the reference timing therefor. In this case, there is no limitation as long as it is a circuit configured so as to perform charge sharing when the polarity of the data signal S(i) is inverted. Various other circuits may be employed, and the present invention is applicable to such circuits.

As described above, the liquid crystal display device 1000 according to one embodiment of the present invention includes, for example, a plurality of scan lines (GL1 to GLm), and a plurality of data lines (SL1 to SLn) crossing the plurality of scan lines (GL1 to GLm), as shown in FIG. 1. It includes a plurality of picture element forming portions 101 corresponding to the intersections between the scan lines (GL1 to GLm) and the data lines (SL1 to SLn). A voltage is written to a picture element forming portion 101 by a data signal (S(1) to S(n)) applied to the data line (SL1 to SLn) while the scan line (GL1 to GLm) is selected.

The liquid crystal display device 1000 includes polarity inversion signal output means, data signal output means, data line short-circuiting means, and selection signal output means, as shown in FIG. 1.

Here, the polarity inversion signal output means inverts the polarity of the data signal (S(i)) once in the first one of the n iterations (n is an integer of 2 or more) of the horizontal blanking period BL. The polarity inversion signal output means outputs the polarity inversion signals (the polarity specifying signal REV and the reference specifying signal LS) for inverting the polarity of the data signal (S(i)) twice in each of the remaining n−1 iterations.

The data signal output means outputs the data signal (S(i)) whose polarity is inverted based on the polarity inversion signals (the polarity specifying signal REV and the reference specifying signal LS). The data line short-circuiting means short-circuits the plurality of data lines (SL1 to SLn) when inverting the polarity of the data signal (S(i)).

The selection signal output means selects the scan line (GL1 to GLm) in the write period WR in which the data signal (S(i)) is applied to the picture element forming portion 101. Moreover, the selection signal output means outputs the selection signal G(j), wherein before a scan line GLj which has been once selected is selected again in the write period WR, the selection signal G(j) selects the scan line (GL1 to GLm) in synchronism with the timing for short-circuiting the data lines (SL1 to SLn).

In the embodiment described above, the display control circuit 200 generates and outputs the polarity inversion signals (the polarity specifying signal REV and the reference specifying signal LS), serving as the "polarity inversion signal output means" described above. The data driver 300 outputs the data signal (S(i)) whose polarity is inverted based on the polarity inversion signals (the polarity specifying signal REV and the reference specifying signal LS), serving as the "data signal output means" described above. The data driver 300 short-circuits the plurality of data lines (SL1 to SLn) when inverting the polarity of the data signal (S(i)), serving as the "data line short-circuiting means" described above. The gate driver 400 outputs the selection signal G(j), serving as the "selection signal output means" described above.

The liquid crystal display device 1000 has such a specification that the data lines (SL1 to SLn) can be short-circuited together upon polarity transition of the data signal (S(i)), as in the embodiment shown in FIGS. 3-5. That is, in the embodiment shown in FIGS. 3-5, the data lines (SL1 to SLn) are short-circuited together through the second MOS transistors SWb (see FIG. 6) as switching elements, by the charge sharing control signal Csh, upon polarity transition of the data signal (S(i)).

The polarity of each data signal (S(i)) is maintained in the write period WR as shown in FIGS. 3-5. Moreover, it is possible to perform the short-circuiting described above (short-circuiting of the data lines (SL1 to SLn)) in all the horizontal blanking periods BL. Therefore, by the pulse Pw of the selection signal G(j), the scan line (GL1 to GLm) is selected in synchronism with the timing of the short-circuiting (short-circuiting of the data lines (SL1 to SLn)). Thus, it is possible to perform the short-circuiting (short-circuiting of picture element electrodes: charge sharing) at an intended timing. Thus, it is possible to perform an impulse driving operation in a multiple line inversion driving operation. As a result, it is possible to display an image with a high image quality.

As shown in FIGS. 3-5, the present invention is configured so that switching can be performed so as to invalidate the state where the polarity of the data signal (S(i)) is inverted twice in each of the n−1 iterations of the horizontal blanking period BL.

For example, as shown in FIGS. 3-5, the polarity of the data signal (S(i)) may be inverted once in the first one of the n iterations (n is an integer of 2 or more) of the horizontal blanking period BL, and the polarity of the data signal (S(i)) may be inverted twice in each of the remaining n−1 iterations. This realizes a configuration where the polarity of the data signal (S(i)) is transitioned at a rate of once every n iterations of the horizontal blanking period BL. Therefore, it is possible to reduce the power consumption used when inverting the polarity of the data signal (S(i)).

DESCRIPTION OF REFERENCE CHARACTERS

31 Output buffer
33 Inverter
34, 35 D flip flop
36 EXOR circuit
37 AND circuit
100 Display section
200 Display control circuit
200*a* Memory
210 Remote controller
300 Data driver
310 Charge sharing section
320 Timing control section
400 Gate driver

The invention claimed is:

1. A liquid crystal display device comprising:
a plurality of scan lines;
a plurality of data lines crossing the plurality of scan lines;
a plurality of picture element forming portions each corresponding to an intersection between a scan line and a data line, wherein a voltage is written to the picture element forming portion by a data signal applied to the data line while the scan line is selected;
polarity inversion signal output means for outputting a polarity inversion signal which inverts a polarity of the data signal once in a first one of n iterations (n is an integer of 2 or more) of a horizontal blanking period, while inverting the polarity of the data signal twice in each of the remaining n−1 iterations;
data signal output means for outputting a data signal whose polarity is inverted based on the polarity inversion signal;
data line short-circuiting means for short-circuiting a plurality of the data lines together when inverting the polarity of the data signal; and
selection signal output means for outputting a selection signal which selects a scan line in a write period during which the data signal is applied to the picture element forming portion, and which selects the scan line in synchronism with a timing of the short-circuiting before the once-selected scan line is selected again in a write period,
wherein
the polarity inversion signal includes a polarity specifying signal for specifying the polarity of the data signal, and a reference specifying signal for specifying a reference timing for referencing the polarity specifying signal; and
the data signal output means inverts the polarity of the data signal if the polarity specified by the polarity specifying signal at the reference timing is different from the polarity specified at the previous reference timing, and
wherein,
the reference specifying signal is formed by a first pulse and a second pulse, the first pulse being obtained by inverting a voltage level twice in every horizontal blanking period, and the second pulse being obtained by inverting the voltage level twice before the first pulse at least in the n−1 iterations of the horizontal blanking period; and
the polarity specifying signal is formed by a third pulse and an edge, the third pulse being obtained by inverting the voltage level once before the transition of the voltage level of the second pulse and transitioning the voltage level once before the transition of the voltage level of the first pulse, and the edge being obtained by transitioning the voltage level at a timing preceding the third pulse at a rate of once every n iterations of a horizontal scanning period.

2. The liquid crystal display device of claim 1, wherein the polarity inversion signal output means outputs a signal having a pulse width as specified by predetermined pulse width specifying data.

3. The liquid crystal display device of claim 2, wherein the polarity inversion signal output means includes a memory, and adjusts the pulse width by referencing the pulse width specifying data which is pre-recorded on the memory.

4. The liquid crystal display device of claim 3, wherein the memory is an EPROM.

5. The liquid crystal display device of claim 1, wherein the polarity inversion signal output means is capable of stopping or allowing, by adjusting a pulse width, the output of the second pulse of the reference specifying signal and the third pulse of the polarity specifying signal.

6. The liquid crystal display device of claim 5, wherein the output of the second pulse and the third pulse is stopped or allowed in response to an operation from outside the liquid crystal display device.

7. A display control device for controlling a polarity of a data signal to be applied to a plurality of picture element forming portions of a liquid crystal display device, thereby controlling a display on the liquid crystal display device, comprising:
   polarity inversion signal output means for outputting a polarity inversion signal which inverts the polarity of the data signal once in a first one of n iterations (n is an integer of 2 or more) of a horizontal blanking period, while inverting the polarity of the data signal twice in each of the remaining n−1 iterations; and
   data signal output means for outputting a data signal whose polarity is inverted based on the polarity inversion signal,
   wherein
   the polarity inversion signal includes a polarity specifying signal for specifying the polarity of the data signal, and a reference specifying signal for specifying a reference timing for referencing the signal; and
   the data signal output means inverts the polarity of the data signal if the polarity specified by the polarity specifying signal at the reference timing is different from the polarity specified at the previous reference timing, and
   wherein
   the reference specifying signal is formed by a first pulse and a second pulse, the first pulse being obtained by inverting a voltage level twice in every horizontal period, and the second pulse being obtained by inverting the voltage level twice before the first pulse at least in the n−1 iterations of the horizontal blanking period; and
   the polarity specifying signal is formed by a third pulse and an edge, the third pulse being obtained by inverting the voltage level once before the transition of the voltage level of the second pulse and transitioning the voltage level once before the transition of the voltage level of the first pulse, and the edge being obtained by transitioning the voltage level at a timing preceding the third pulse at a rate of once every n iterations of a horizontal scanning period.

8. A liquid crystal display method for writing a voltage to a picture element forming portion by a data signal applied to a data line while a scan line is selected, the method comprising:
   a data signal output step of outputting a data signal, in which a polarity of the data signal is inverted once in a first one of n iterations (n is an integer of 2 or more) of a horizontal blanking period, while inverting the polarity of the data signal twice in each of the remaining n−1 iterations;
   a data line short-circuiting step of short-circuiting a plurality of the data lines when inverting the polarity of the data signal; and
   a selection signal output step of outputting a selection signal which selects a scan line in a write period during which the data signal is applied to the picture element forming portion, and which selects the scan line in synchronism with a timing of the short-circuiting before the once-selected scan line is selected again in a write period,
   wherein
   the polarity inversion signal includes a polarity specifying signal for specifying the polarity of the data signal, and a reference specifying signal for specifying a reference timing for referencing the polarity specifying signal; and
   the data signal output step inverts the polarity of the data signal if the polarity specified by the polarity specifying signal at the reference timing is different from the polarity specified at the previous reference timing, and
   wherein
   the reference specifying signal is formed by a first pulse and a second pulse, the first pulse being obtained by inverting voltage level twice in every horizontal blanking period, and the second pulse being obtained by inverting the voltage level twice before the first pulse at least in the n−1 iterations of the horizontal blanking period; and
   the polarity specifying signal is formed by a third pulse and an edge, the third pulse being obtained by inverting the voltage level once before the transition of the voltage level of the second pulse and transitioning the voltage level once before the transition of the voltage level of the first pulse, and the edge being obtained by transitioning the voltage level at a timing preceding the third pulse at a rate of once every n iterations of a horizontal scanning period.

\* \* \* \* \*